(12) United States Patent  
Shiba et al.

(10) Patent No.: US 6,644,129 B1
(45) Date of Patent: Nov. 11, 2003

(54) FLOW RATE MEASUREMENT APPARATUS

(75) Inventors: Fumikazu Shiba, Nara (JP); Yuji Nakabayashi, Nara (JP)

(73) Assignee: Matsushita Electric Co., Ltd., Osaka (JP)

( * ) Notice: Subject to any disclaimer, the term of this patent is extended or adjusted under 35 U.S.C. 154(b) by 0 days.

(21) Appl. No.: 09/979,589

(22) PCT Filed: May 11, 2000

(86) PCT No.: PCT/JP00/03043

§ 371 (c)(1),
(2), (4) Date: Nov. 16, 2001

(87) PCT Pub. No.: WO00/70312

PCT Pub. Date: Nov. 23, 2000

(30) Foreign Application Priority Data

May 17, 1999 (JP) .......................................... 11-135284

(51) Int. Cl.[7] ................................................ G01F 1/66
(52) U.S. Cl. ................................................... 73/861.27
(58) Field of Search ........................ 73/861.27, 861.04, 73/861.17, 204.11; 137/503

(56) References Cited

U.S. PATENT DOCUMENTS

| | | | | |
|---|---|---|---|---|
| 3,879,984 A | * | 4/1975 | Welland | 73/23.24 |
| RE28,929 E | * | 8/1976 | Brown | 73/861.33 |
| 4,287,774 A | * | 9/1981 | Grebe, Jr. et al. | 73/861.17 |
| 4,542,650 A | * | 9/1985 | Renken et al. | 73/196 |
| 4,936,870 A | * | 6/1990 | Baumann et al. | 48/197 R |
| 5,608,170 A | * | 3/1997 | Atkinson et al. | 73/861.04 |

FOREIGN PATENT DOCUMENTS

| | | |
|---|---|---|
| JP | 8-271307 | 10/1996 |
| JP | 9-43016 | 2/1997 |
| JP | 10-239126 | 9/1998 |
| JP | 11-118555 | 4/1999 |

* cited by examiner

*Primary Examiner*—Edward Lefkowitz
*Assistant Examiner*—Jewel V. Thompson
(74) *Attorney, Agent, or Firm*—Snell & Wilmer, LLP

(57) ABSTRACT

A flow rate measurement apparatus includes: a plurality of flow paths 13 provided between an inflow port 11 and an outflow port 12; opening/closing sections 14 for opening/closing the plurality of flow paths 13; measurement sections 15 for measuring a flow rate of fluid flowing through at least one of the plurality of flow paths 13; and a control section 17 for controlling the opening/closing sections 14 and the measurement sections 15; The control section 17 includes a gain adjustment section 16 for correcting a gain of the measurement section 15 in a flow path which is closed by the opening/closing section 14.

23 Claims, 21 Drawing Sheets

FLOW RATE MEASUREMENT APPARATUS

TECHNICAL FIELD

The present invention relates to a flow rate measurement apparatus for measuring a flow rate of fluid, such as gas or the like.

BACKGROUND ART

There are many known methods for measuring the flow rate of fluids, such as gases, liquids, etc. Especially, reliable flow velocity/flow rate measurement apparatuses which utilize ultrasonic waves have been remarkably developed thanks to progress in techniques of electronics. The flow velocity/flow rate measurement apparatuses which utilize ultrasonic waves can be employed in various application fields, such as a meter for fuel gas, an industrial measurement device, a blood-flow meter for medical use, measurement of flow velocity in the ocean or atmosphere, etc. Such flow velocity/flow rate measurement apparatuses can directly utilize ultrasonic waves in some cases, and in other cases, can be utilized as a detecting section of a measurement apparatus which operates based on other measurement principles and which indirectly utilize ultrasonic waves.

As shown in FIG. 21, a conventional ultrasonic flow-velocity meter includes: an ultrasonic transmitting transducer 2 which is placed in a measurement path 1 through which fluid flows; a transmission circuit 3 for driving the ultrasonic transmitting transducer 2; a controller 5 for simultaneously transmitting a vibration start signal from the transmission circuit 3 and for starting a timer 4; an ultrasonic receiving transducer 6 which is placed upstream or downstream of the ultrasonic transducer 2 and which receives ultrasonic waves emitted by the ultrasonic transducer 2; an amplifier 7 for amplifying a received signal from the ultrasonic receiving transducer 6; and a comparator 9 for comparing the signal output from the amplifier 7 and a reference signal output from a reference signal generating section 8 and for stopping the timer 4 when the relationship of the magnitudes between these signals is inverted. This conventional ultrasonic flow-velocity meter is structured such that the flow velocity of the measured fluid is measured based on a time measured by the timer 4.

In the above ultrasonic flow-velocity meter, in response to a start signal from the controller 5, the transmission circuit 3 outputs a pulse during a predetermined time so as to drive the ultrasonic transducer 2. An ultrasonic wave emitted by the ultrasonic transducer 2 propagates through the measured fluid and is then received by the ultrasonic receiving transducer 6 after a lapse of time t. This received signal is compared with a reference signal by the comparator 9. When the relationship in voltage between the received signal and the reference signal is inverted, a stop signal is transmitted to the timer 4. In response to this stop signal, the timer 4 stops. The flow velocity v of the measured fluid is calculated by assigning an output value, obtained for time t, in expression (1):

$$V=(L/(t-a))-c \tag{1}$$

where L denotes the effective distance along a flowing direction between the ultrasonic wave transmitter and the ultrasonic wave receiver, c denotes a sonic velocity, v denotes a flow velocity of the measured fluid, a denotes a delay time from when the signal is received to when the output of the comparator 9 is inverted. A direction from the ultrasonic transducer to the ultrasonic receiving transducer is referred to as the positive direction.

Alternatively, the ultrasonic transducer 2 and the ultrasonic receiving transducer 6 are switched, and a propagation time $t_1$ from upstream to downstream and a propagation time $t_2$ from downstream to upstream are measured so as to obtain a flow velocity v based on expression (2):

$$v=L/2(1/t_1-1/t_2)+a \tag{2}$$

According to this method, the velocity of a flowing fluid can be measured independent from influences caused by a change in sonic velocity due to changes in temperature. Thus, this method has been widely used in measurement of flow velocity, flow rate, distance, etc.

Not only flow velocity/flow rate measurement apparatuses which utilize ultrasonic waves but also general flow velocity/flow rate measurement apparatuses that use many sensors, such as a flow rate sensor, a resistance sensor, a temperature sensor, a voltage sensor, etc. These sensors, which transmit electric signals, are influenced by external conditions such that the sensitivity thereof is changed in some cases. Thus, a flow rate measurement apparatus used in a meter for fuel gas or the like is required to measure even a very small change in flow rate, e.g., 3 liters/hour. In order to correctly detect such a very small change, a measurement apparatus must be structured such that it can perform zero-point correction for measurements.

In view of the above, a technique disclosed in Japanese Laid-Open Publication No. 8-271307 is a gas flow-rate meter which determines, at a predetermined time interval, whether or not performing zero-point correction is appropriate and performs zero-point correction based on such a determination. This is regarded as a very useful technique in the field of gas equipment.

However, when the above conventional structure is applied to a flow rate measurement apparatus for fuel gas such as propane gas, the flow rate of fluid widely varies in a flow path; for example, change in flow rate is very small in some cases, but change in flow rate is several ten-thousand liters per hour in other cases. Accordingly, the input waveform of a received signal widely varies according to the flow velocity. Thus, it is difficult to measure the flow rate without adjusting reception sensitivity.

In general, a sensor which transmits an electric signal is influenced by external conditions such that the sensitivity thereof may be changed. Thus, a flow rate measurement apparatus used in a meter for fuel gas or the like is required to measure even a very small change in flow rate, e.g., 3 liters/hour. In order to correctly detect various magnitudes of change over such a wide range of a very small change to several ten-thousand liters per hour, a measurement apparatus must be structured such that reception conditions for measurement (gain or the like) are adjusted at a predetermined time interval. In such a case, in equipment where a flow of fluid is never interrupted, it is impossible to close a flow path, such that a correction cannot be performed.

In view of the problems involved in the above conventional example, an objective of the present invention is to provide a structure having a plurality of flow paths, wherein the gain of a circuit which receives and amplifies a signal from a sensor is corrected and adjusted in a flow path in which flow rate measurement is not being performed, and the flow path in which the gains of the sensor and the circuit have been adjusted is opened for use in the flow rate measurement.

According to a method for performing zero-point correction, it is determined at a predetermined time interval whether or not it is necessary to perform zero-point correction, and when necessary, the zero-point correction is performed. Thus, in equipment where a flow of fluid is never interrupted, it is impossible to close a flow path, such that the zero-point correction cannot be performed.

In view of the problems involved in the above conventional example, another objective of the present invention is to provide a structure having a plurality of flow paths wherein the zero-point correction is performed in a flow path in which flow rate measurement is not being performed, and the flow path in which the zero-point correction has been completed is opened for use in the flow rate measurement.

DISCLOSURE OF INVENTION

The present invention is very useful when it is applied to a meter for fuel gas such as propane gas or city gas. This is because a flow rate measurement apparatus for fuel gas is required to detect a change in the flow rate, e.g., 3 liters/hour. The present invention is useful in that a correct flow rate can be measured by correcting the gains of various sections, such as a measurement section, a flow rate calculation section, etc., over a wide range from a very small flow rate change to several ten-thousand liters per hour.

In view of the above spirit of the present invention, the present invention is useful in any field in which correct measurement of flow rate is required.

A person skilled in the art can practice the present invention by a structure recited in each of the claims. Nevertheless, in addition to means for achieving the claimed inventions and the structures of the claimed inventions, the functions and effects of each of the claims are described so as to help a reader of this specification readily understand the features of the present invention and grasp the embodiments of present invention.

A flow rate measurement apparatus of the present invention includes: a plurality of flow paths provided between an inflow port and an outflow port; opening/closing sections for opening/closing the plurality of flow paths; measurement sections for measuring a flow rate of fluid flowing through at least one of the plurality of flow paths; and a control section for controlling the opening/closing sections and the measurement sections; wherein the control section includes a gain adjustment section for correcting a gain of the measurement section in a flow path which is closed by the opening/closing section. With this structure, the above objective is achieved.

According to the present invention, the flow rate measurement apparatus has a structure including a plurality of flow paths. In such a structure, an extended measurement range of the fluid flow rate can be obtained. Furthermore, even in an apparatus in which flow of fluid does not stop, gain correction is performed in a flow path in which flow rate measurement is not being performed, and then, opening/closing sections are switched so that the flow rate measurement can be performed using the flow path in which the gain correction has been completed. Thus, when this flow path in which the gain correction has been completed is opened, a stable measurement system can be obtained, measurement is free from a variation in reception sensitivity, and the measurement accuracy is prevented from being unstable.

The control section may include a first timer section for switching a flow path so as to be closed by the opening/closing section at a predetermined time interval. With this structure, even when the flow of fluid is maintained and the flow rate thereof is being measured, the gain of a measurement section in a closed flow path is corrected, and opening/closing of flow paths are switched at a predetermined time interval. From such an arrangement, even when a variation in the gain of the measurement section is caused in a flow path in which flow rate measurement is being performed due to a secular change or the like, stable measurement with no variation in reception sensitivity can be recovered within a certain time, and the measurement accuracy is prevented from being unstable.

The control section may include: a flow rate calculation section for calculating a flow rate based on an output of the measurement section; and a flow rate determination section for transmitting to the gain adjustment section a signal which starts a correction of the gain of the measurement section when the flow rate calculated by the flow rate calculation section is lower than a predetermined flow rate. With this structure, in a flow path in which an opening/closing section is closed, a gain point can be corrected when the flow of the fluid is small, and accordingly, an error is not caused due to an external disturbance from downstream.

The control section may include: a flow rate calculation section for calculating a flow rate based on an output of the measurement section; and a flow rate determination section for transmitting to the gain adjustment section a signal which stops a correction of the gain of the measurement section when the flow rate calculated by the flow rate calculation section during the correction of the gain of the measurement section is higher than a predetermined flow rate. With this structure, when the flow rate is increased, gain correction is stopped so that measurement of the flow rate can be immediately started without decreasing the measurement sensitivity. This is because a gain correction operation for a measurement section in a closed flow path can be adversely influenced by an external disturbance caused due to a large quantity of fluid from downstream, or because it, may be required to open the opening/closing sections for allowing the fluid to flow through the flow paths in order to measure a high flow rate.

The control section may include a second timer section for transmitting a signal, which starts a correction of the gain of the measurement section, to the gain adjustment section at a predetermined time interval. With this structure, the gain of a measurement section in a flow path in which an opening/closing section is closed can be corrected at a predetermined time interval. Therefore, even when a variation is caused in the gain due to secular changes including external disturbances, such as temperature, humidity, etc., a correction is performed such that the variation is reduced within a predetermined time.

The control section may include a time measurement section for transmitting a signal, which starts a correction of the gain of the measurement section at a prescribed time, to the gain adjustment section at a predetermined time interval. With this structure, a flow rate state, which is specific to a system in which the flow rate measurement apparatus is installed, is previously measured. For example, a time when the flow rate is low is set in a time measurement section, and the gain correction is performed at the time set in the time measurement section, whereby the accuracy of the measurement section can be adjusted at an optimum time.

The control section may include a time measurement section for storing, in a storage section, a time when a flow rate of fluid flowing through a flow path is continuously maintained equal to or lower than a predetermined flow rate and for transmitting to the gain adjustment section a signal, which starts a correction of the gain of the measurement section, at the time stored in the storage section. With this structure, the use conditions inherent to a system to which the flow rate measurement apparatus is attached and the state of the system are previously stored. Furthermore, the state of the gain of the measurement section is checked at a time when the flow rate is stable, whereby the measurement section can be adjusted more accurately.

The control section may include a communication section for receiving a signal from outside of the flow rate measurement apparatus and transmitting to the gain adjustment section a signal which starts a correction of the gain of the measurement section. With this structure, a user can correct the gain of a measurement section externally at any time. Thus, even when a system becomes unstable due to a sudden external disturbance or the like, a user can manually transmits a signal for correcting the gain.

The measurement section may include: a first transducer and a second transducer which transmit and receive an ultrasonic wave signal; a transmission section for transmitting a periodic drive signal to the first transducer and the second transducer; and a flow rate calculation section for calculating a flow rate based on a propagation time of the ultrasonic wave signal between the first transducer and the second transducer. With this structure, the flow rate can be measured without causing a disturbance in the flow of the fluid. Moreover, due to the available combinations of a plurality of flow paths, the flow rate can be quickly measured with a high accuracy over a wide flow rate range.

The measurement section may include: a thermosensitive section for detecting a change in temperature which is caused by a change in flow rate; and a flow rate calculation section for calculating a flow rate based on an output of the thermosensitive section. With this structure, stable flow rate measurement can be achieved with a control circuit having a simple structure. Furthermore, the measurement section does not have movable parts, and therefore, the failure rate thereof is low. Moreover, due to combinations of a plurality of flow paths, the flow rate can be quickly measured with high accuracy over a wide flow rate range.

A flow rate measurement apparatus of the present invention includes: a plurality of flow paths provided between an inflow port and an outflow port; opening/closing sections for opening/closing the plurality of flow paths; measurement sections for measuring a flow rate of fluid flowing through at least one of the plurality of flow paths; and a control section for controlling the opening/closing sections and the measurement sections; wherein the control section includes a zero-point examination section for detecting and correcting a zero-point of the measurement section in a flow path which is closed by the opening/closing section. With this structure, the above objective is achieved.

According to the present invention, the flow rate measurement apparatus has a structure including a plurality of flow paths. In such a structure, an extended measurement range of the fluid flow rate can be obtained. Furthermore, even in an apparatus in which flow of fluid does not stop, the zero-point correction is performed in a flow path in which flow rate measurement is not being performed, and then, opening/closing sections are switched such that the flow rate measurement can be performed using the flow path in which the zero-point correction has been completed. Thus, when this flow path, in which the zero-point correction has been completed, is opened, a stable measurement system can be obtained, measurement is free from variations in reception sensitivity, and the measurement accuracy is prevented from being unstable.

The control section may include a third timer section for switching a flow path so as to be closed by the opening/closing section at a predetermined time interval. With this structure, even when the flow of fluid is kept and the flow rate thereof is being measured, the zero-point of a measurement section in a closed flow path is corrected, and opening/closing of flow paths are switched at a predetermined time interval. Due to such an arrangement, even when a variation in the zero-point of the measurement section is caused in a flow path in which flow rate measurement is being performed due to a secular change or the like, stable measurement with no variation in reception sensitivity can be obtained within a certain time, and the measurement accuracy is prevented from being unstable.

The control section may include: a flow rate calculation section for calculating a flow rate based on an output of the measurement section; and a flow rate determination section for transmitting to the zero-point examination section a signal which starts a correction of the zero-point of the measurement section when the flow rate calculated by the flow rate calculation section is lower than a predetermined flow rate. With this structure, in a flow path in which an opening/closing section is closed, a zero-point can be corrected when the flow of the fluid is small, and accordingly, an error is not caused due to an external disturbance from downstream.

The control section may include: a flow rate calculation section for calculating a flow rate based on an output of the measurement section; and a flow rate determination section for transmitting to the zero-point examination section a signal which stops a correction of the zero-point of the measurement section when the flow rate calculated by the flow rate calculation section during the correction of the zero-point of the measurement section is higher than a predetermined flow rate. With this structure, when the flow rate is increased, zero-point correction is stopped such that measurement of the flow rate can be immediately started without decreasing the measurement sensitivity. This is because a zero-point correction operation for a measurement section in a closed flow path can be adversely influenced by an external disturbance caused due to a large quantity of fluid from downstream, or because it may be required to open the opening/closing sections for allowing the fluid to flow through the flow paths in order to measure a high flow rate.

The control section may include a fourth timer section for transmitting a signal which starts a correction of the zero-point of the measurement section to the zero-point examination section at a predetermined time interval. With this structure, the zero-point of a measurement section in a flow path in which an opening/closing section is closed can be corrected at a predetermined time interval. Therefore, even when a variation is caused in the zero-point due to secular changes including external disturbances, such as temperature, humidity, etc., a correction is performed such that the variation is reduced within a predetermined time.

The control section may include a time measurement section for transmitting a signal, which starts a correction of the zero-point of the measurement section at a prescribed time, to the zero-point examination section at a predetermined time interval. With this structure, a flow rate state which is specific to a system in which the flow rate measurement apparatus is installed, is previously measured. For example, a time when the flow rate is low is set in a time measurement section, and the zero-point correction is performed at the time set in the time measurement section, whereby the accuracy of the measurement section can be adjusted at an optimum time.

The control section may include a time measurement section for storing in a storage section a time when a flow rate of fluid flowing through a flow path is continuously maintained equal to or lower than a predetermined flow rate and transmitting to the zero-point examination section a signal which starts a correction of the zero-point of the measurement section at the time stored in the storage section. With this structure, the use conditions inherent to a system to which the flow rate measurement apparatus is attached and the state of the system are previously stored, and the state of the zero-point of the measurement section is corrected at a time when the flow rate is stable, whereby the measurement section can be adjusted more accurately.

The control section may include a communication section for receiving a signal from outside of the flow rate measurement apparatus and transmitting to the zero-point examination section a signal which starts a correction of the zero-point of the measurement section. With this structure, a user can externally correct the zero-point of a measurement section at any time. Thus, even when a system becomes unstable due to a sudden external disturbance or the like, a user can manually transmits a signal for correcting the zero-point.

The measurement section may include: a first transducer and a second transducer which transmit and receive an ultrasonic wave signal; a transmission section for transmitting a periodic drive signal to the first transducer and the second transducer; and a flow rate calculation section for calculating a flow rate based on a propagation time of the ultrasonic wave signal between the first transducer and the second transducer. With this structure, the flow rate can be measured without causing a disturbance in the flow of the fluid. Moreover, due to the available combinations of a plurality of flow paths, the flow rate can be quickly measured with high accuracy over a wide flow rate range.

The measurement section may include: a thermosensitive section for detecting a change in temperature which is caused by a change in flow rate; and a flow rate calculation section for calculating a flow rate based on an output of the thermosensitive section. With this structure, stable flow rate measurement can be achieved with a control circuit having a simple structure. Furthermore, the measurement section does not have movable parts, and therefore, the failure rate thereof is low. Moreover, due to combinations of a plurality of flow paths, the flow rate can be quickly measured with high accuracy over a wide flow rate range.

A flow rate measurement apparatus of the present invention includes: a plurality of flow paths provided between an inflow port and an outflow port; opening/closing sections for opening/closing the plurality of flow paths; measurement sections for measuring a flow rate of fluid flowing through at least one of the plurality of flow paths; and a control section for controlling the opening/closing sections and the measurement sections; wherein the control section includes at least one of: a zero-point examination section for detecting and correcting a zero-point of the measurement section in a flow path which is closed by the opening/closing section; a gain adjustment section for correcting a gain of the measurement section in a flow path which is closed by the opening/closing section; and a total flow rate measurement section for measuring a total flow rate of fluid flowing from the inflow port to the outflow port, and the measurement section includes: a first transducer and a second transducer which transmit and receive an ultrasonic wave signal; a transmission section for transmitting a periodic drive signal to the first transducer and the second transducer; an amplifying section for amplifying the received ultrasonic wave signal; a comparison section for comparing a signal output from the amplifying section with a reference signal; a repetition section for repeating ultrasonic wave transmission a plurality of times between the first transducer and the second transducer according to an output of the comparison section; a delay section for delaying the ultrasonic wave transmission during the repetition of the ultrasonic wave transmission; and a flow rate calculation section for calculating a flow rate based on a propagation time of the ultrasonic wave signal between the first transducer and the second transducer. With this structure, the above objective is achieved.

BEST MODE FOR CARRYING OUT THE INVENTION

Hereinafter, embodiments of the present invention are described with reference to the drawings.

(Embodiment 1)

Figure 1A:
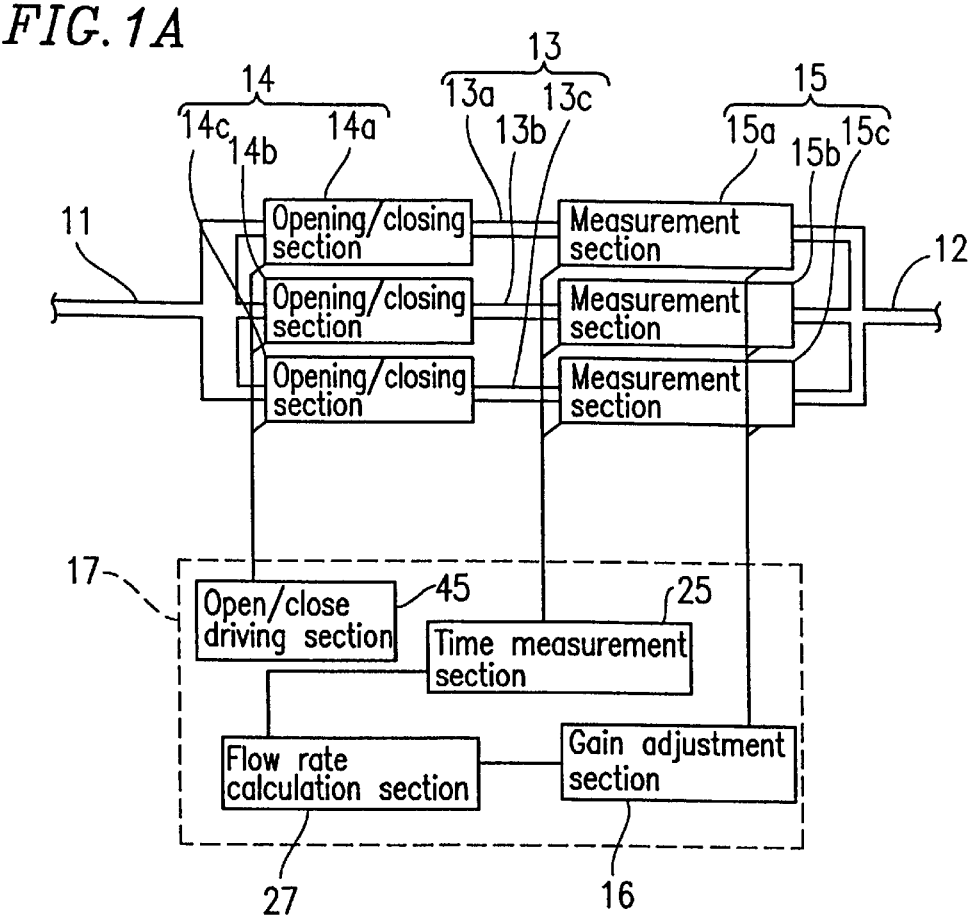
FIG. 1A is a block diagram showing a structure of a flow rate measurement apparatus according to embodiment 1 of the present invention.
Figure 1B:
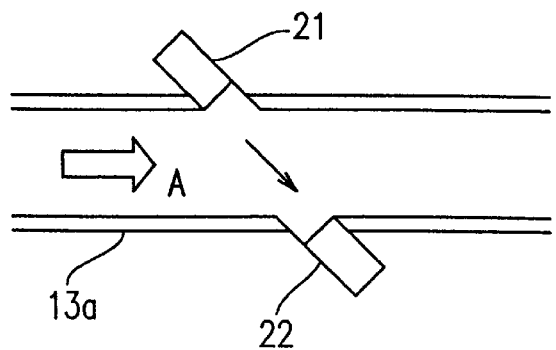
FIG. 1B is a diagram schematically showing a structure of a measurement section of the flow rate measurement apparatus shown in FIG. 1A.
Figure 2:
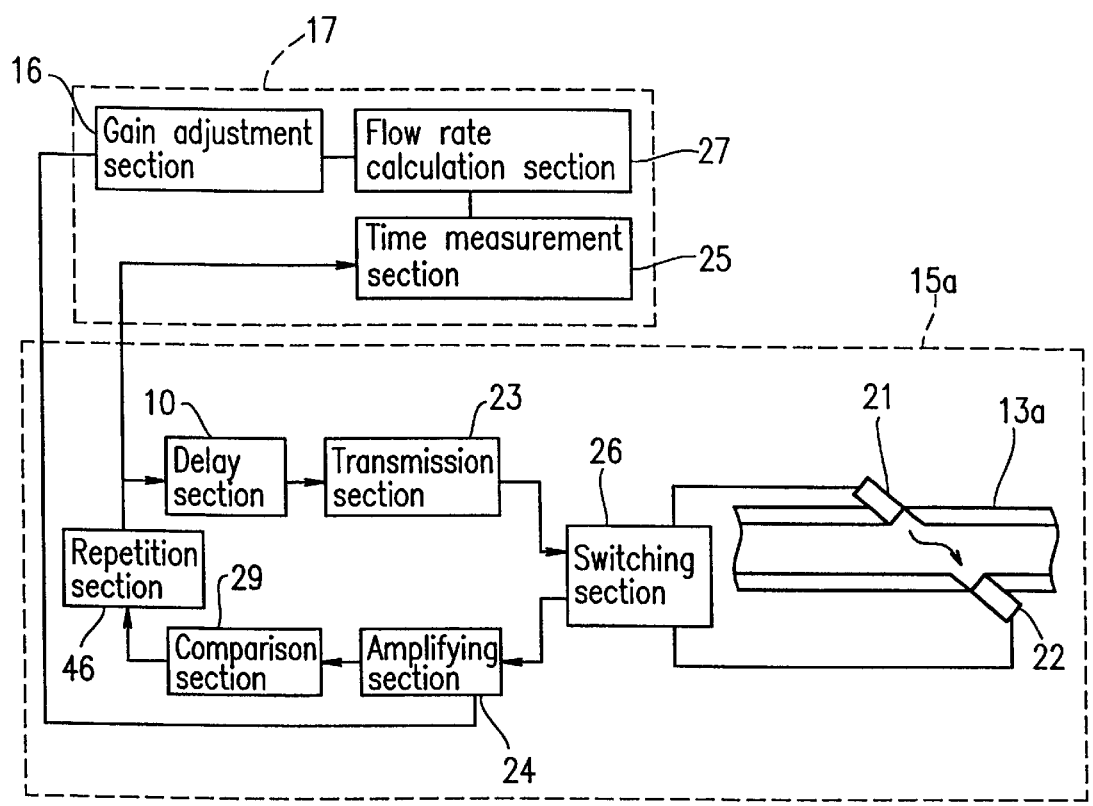
FIG. 2 is a block diagram showing a structure of the measurement section and a control section of the flow rate measurement apparatus shown in FIG. 1A.

FIG. 1A is a block diagram showing a structure of a flow rate measurement apparatus according to embodiment 1 of the present invention. FIG. 1B is a diagram schematically showing a structure of a measurement section of the flow rate measurement apparatus shown in FIG. 1A. FIG. 2 is a block diagram showing a structure of the measurement section and a control section of the flow rate measurement apparatus shown in FIG. 1A.

As shown in FIG. 1A, the flow rate measurement apparatus includes: a plurality of flow paths 13 provided between an inflow path 11 and an outflow path 12; opening/closing sections 14 for opening/closing the plurality of flow paths 13; measurement sections 15 for measuring the flow rate of fluid passing through at least one of the plurality of flow paths 13; and a control section 17 for controlling the opening/closing sections 14 and the measurement sections 15. The control section 17 includes: a gain adjustment section 16 for correcting a gain of the measurement section 15 in the flow paths 13 closed by the opening/closing sections 14; and open/close driving section 45 for driving the opening/closing sections 14. In the example illustrated in FIG. 1A, the flow rate measurement apparatus includes: the three flow paths 13 (13a–13c); the opening/closing sections 14 (14a–14c) provided in the flow paths 13; and the measurement sections 15 (15a–15c). The opening/closing section 14a and the measurement section 15a are attached to the flow path 13a. The opening/closing section 14b and the measurement section 15b are attached to the flow path 13b. The opening/closing section 14c and the measurement section 15c are attached to the flow path 13c.

Fluid entering through the inflow path 11 passes through the opened opening/closing sections 14 and the flow rate thereof is measured by the measurement sections 15. The opening/closing sections 14 and the measurement sections 15 are controlled by the control section 17. The opening/closing sections 14 can open or close their respective flow paths 13. The measurement sections 15 measure the flow rate of fluid flowing through the flow paths opened by the opening/closing sections 14. The total flow rate from the inflow path 11 to the outflow path 12 is obtained by the control section 17 by summing up flow rates, which are measured for the respective flow paths by the measurement sections 15.

By opening all of the flow paths 13, it is possible to allow a fluid to flow therethrough at a high flow rate, and it is also possible to measure the flow rate of the fluid. By opening only one of the flow paths 13, it is possible to allow a fluid to flow therethrough at a low flow rate. Thus, the plurality of opening/closing sections 14, each of which can be separately opened/closed by the open/close driving section 45, are used, whereby selection of flow paths according to the flow rate, or the like, are readily achieved, and measurement is enabled over a wide flow rate range.

The flow paths 13 may be formed by a plurality of flow paths having the same cross-sectional area such that the application range of the flow rate measurement apparatus is increased, and maintenance thereof is facilitated. Alternatively, the flow paths 13 may be formed by a plurality of flow paths having different cross-sectional areas so that an optimum path is selected according to the flow rate or the like. In the example of the present invention, three flow paths are provided, but this number is not especially significant. Any number of flow paths can be provided so long as it is two or more.

A flow rate calculation section 27 performs a calculation of summing up flow rates which are measured for the respective flow paths by the measurement sections 15. In this case, $Q=q_a+q_b+q_c=\Sigma q$, where Q denotes the total flow rate obtained by the flow rate calculation section 27, and $q_a$, $q_b$, and $q_c$ denote the flow rates measured by the measurement sections 15a, 15b, and 15c installed in the flow paths 13a, 13b, and 13c in which the opening/closing sections 14 are open.

When the opening/closing section 14a is close, fluid does not flow through the flow path 13a. Therefore, measurement of the flow rate of fluid by the measurement section 15a does not produce an error in the overall measurement of the flow rate. Since the sensitivity of a sensor for measuring the flow rate is sometimes decreased due to external disturbances, such as a temperature or the like, a secular change, etc., it is necessary to correct a measurement system in such a case. Such a correction is achieved by adjusting the sensitivity of reception means such that, for example, the maximum value of a signal received from the sensor falls within a predetermined level range. This gain adjustment is carried out, in a path 13 in which an opening/closing section 14 is closed, by a corresponding measurement section 15.

In this correction, if the gain is far away from an appropriate range, it is effective to notify a user about the abnormal condition by using announcement means or the like. Moreover, it is also effective to notify an external administrative person about the abnormal condition by using communication means or the like so that the abnormal condition can be corrected earlier.

FIG. 1B shows a portion of a structure of the measurement section 15a provided in the flow path 13a shown in FIG. 1A. It should be noted that each of the measurement sections 15b and 15c has the same structure as that of the measurement section 15a.

An empty arrow A shown in FIG. 1B indicates a direction in which fluid flows in the flow path 13a. The measurement section 15a includes a first transducer 21 and a second transducer 22 provided in the flow path 13a. The first transducer 21 and the second transducer 22 are placed so as to face each other across the fluid flowing through the flow path 13a. The first transducer 21 and the second transducer 22 transmit and receive ultrasonic wave signals.

FIG. 2 shows a structure of the measurement section 15a provided in the flow path 13a shown in FIG. 1A in more detail. It should be noted that each of the measurement sections 15b and 15c has the same structure as that of the measurement section 15a.

As shown in FIG. 2, the measurement section 15a includes a transmission section 23 for transmitting a periodic driving signal to the first transducer 21 and the second transducer 22; an amplifying section 24 for amplifying a received ultrasonic signal; a comparison section 29 for comparing a signal output from the amplifying section 24 and a reference signal; a repetition section 46 for receiving a signal output from the comparison section 29, setting a number of repetitions when a detected signal is equal to or greater than the reference signal, and repeating transmission of ultrasonic waves between the first transducer 21 and the second transducer 22 for the set number of repetitions; and a delay section 10 for delaying the transmission of ultrasonic waves during the repetition.

The gain adjustment section 16 corrects a gain of the measurement section 15a by adjusting a gain of the amplifying section 24.

When the comparison section 29 detects that a signal equal to or greater than the reference signal is output from the amplifying section 24, the comparison section 29 outputs to the repetition section 46 a signal indicating the arrival of a received signal. The repetition section 46 receives a signal output from the comparison section 29 and determines whether or not the number of times this signal is received has reached the repetition number. When the number of times this signal is received has reached the predetermined repetition number, the repetition section 46 controls the transmission section 23 such that an ultrasonic wave signal is transmitted from the transmission section 23 through the delay section 10 for delaying the signal by a predetermined time. In this way, the ultrasonic wave signal is repeatedly transmitted from the transmission section 23.

A switching section 26 switches between transmission/reception of the first transducer 21 and the second transducer 22. Specifically, ultrasonic wave transmission where the first transducer 21 transmits an ultrasonic wave signal and the second transducer 22 receives the ultrasonic wave signal is repeated for the set number of repetitions. Thereafter, ultrasonic wave transmission where the second transducer 22 transmits an ultrasonic wave signal and the first transducer 21 receives the ultrasonic wave signal is repeated for the set number of repetitions.

A time measurement section 25 calculates a time spent for repeating the ultrasonic wave transmission from the first transducer 21 to the second transducer 22 for the set number of repetitions (first transmission time) and a time for repeating the ultrasonic wave transmission from the second transducer 22 to the first transducer 21 for the set number of repetitions (second transmission time).

For example, the time measurement section 25 is a timer counter.

The flow rate calculation section 27 calculates the velocity of fluid based on the time difference between the first transmission time and the second transmission time and calculates the flow rate of the fluid based on the cross-sectional area of the flow path 13 and the velocity of the fluid.

Thus, ultrasonic waves are utilized in the measurement section so as to measure the flow rate without causing a disturbance in the flow of the fluid. Moreover, due to the available combinations of a plurality of flow paths, the flow rate can be quickly measured with high accuracy over a wide flow rate range.

However, the sensitivities of the first transducer 21 and the second transducer 22 are sometimes decreased due to external disturbances, such as a temperature or the like, a secular change, etc. Thus, it is probable that, in the amplifying section 24 for amplifying a received signal, the gain of the received signal is not sufficient so that the flow rate cannot be measured accurately. In order to prevent such a phenomenon, in a path through which fluid is not flowing, the gain adjustment section 16 corrects the gain of the amplifying section 24 and adjusts a signal so as to have an amplitude determinable by the comparison section 29. When this operation is performed, immediately after the opening/closing section 14a is opened, the measurement section 15a can quickly start a measurement operation. Even if there is a transducer whose sensitivity cannot be restored, the measurement can be continued by excluding the flow path which includes this transducer and opening another flow path.

In this embodiment, the sensitivity of the receiver is adjusted. However, the same effect can be obtained by adjusting the power of the transmitter.

In the above example, ultrasonic elements are used in the measurement section, but the present invention is not limited thereto. Similar measurements of flow rate can be achieved by using, as the measurement section, a heat radiation section which utilizes a power source provided in a flow path as a drive source; at least one thermosensitive section for detecting a change in temperature caused by the flow rate; and a flow rate calculation section for calculating the flow rate based on a change in a signal in the thermosensitive section.

However, the sensitivities of the heat radiation section and the thermosensitive section may also be decreased due to external disturbances, such as a temperature or the like, a secular change, etc. Thus, it is probable that, in the amplifying section 24 for amplifying a received signal, the gain of the received signal is not sufficient so that the flow rate cannot be measured accurately. In order to prevent such a phenomenon, in a path through which fluid is not flowing, the gain adjustment section 16 corrects the gain of the amplifying section 24 and adjusts a signal so as to have an amplitude determinable by the comparison section 29.

When this operation is performed, immediately after the opening/closing section 14a is opened, the measurement section 15a can quickly start a measurement operation. Even if there is a heat radiation section or a thermosensitive section whose sensitivity cannot be restored, the measurement can be continued by excluding the flow path which includes this transducer and opening another flow path. Furthermore, the same effects can be obtained by adjusting the power supplied to the heat radiation section.

(Embodiment 2)

Figure 3:
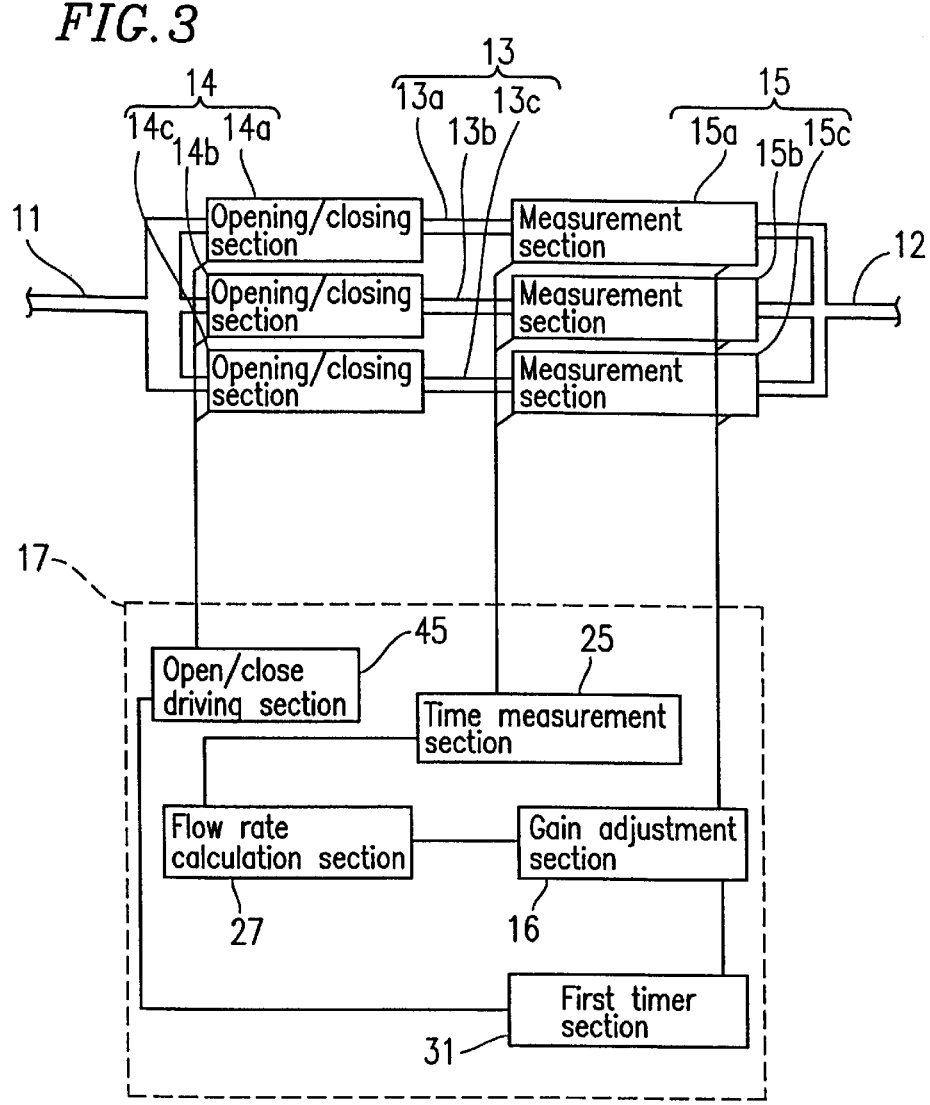
FIG. 3 is a block diagram showing a structure of a control section of a flow rate measurement apparatus according to embodiment 2 of the present invention.
Figure 4:
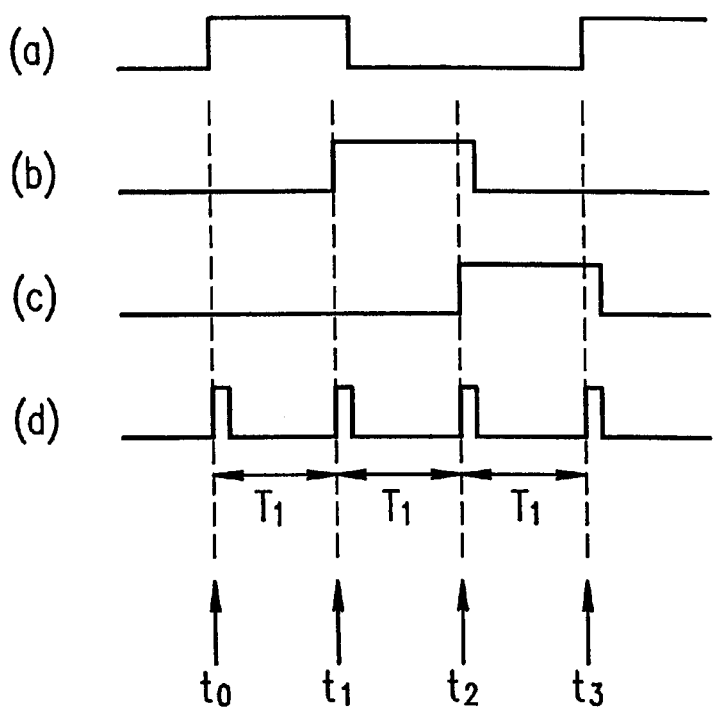
FIG. 4 is a timing chart illustrating operations of opening/closing sections 4a–4c and a first timer section.

Hereinafter, a flow rate measurement apparatus according to embodiment 2 of the present invention is described. The block diagrams of FIGS. 1A and 1B which have been used in embodiment 1 are used again to describe a structure of this embodiment. FIG. 3 is a block diagram showing a structure of the control section 17. FIG. 4 is a timing chart illustrating operations of the control section 17. Embodiment 2 is different from embodiment 1 in that the control section 17 includes a first timer section 31 for performing time management such that the opening/closing sections 14 are switched at a predetermined time interval.

In FIG. 4, part (a) shows an operation of the opening/closing section 14a, part (b) shows an operation of the opening/closing section 14b, part (a) shows an operation of the opening/closing section 14c, and part (d) shows an operation of the first timer section 31.

The first timer section 31 starts its operation simultaneously with the opening of the opening/closing section 14a. The first timer section 31 transmits a pulse signal to the control section 17 every predetermined time period (herein, $T_1$). The control section 17 switches an opening/closing section so as to be opened based on the pulse signal from the first timer section 31. During the first period $T_1$ (from time $t_0$ to time $t_1$), the control section 17 opens the opening/ closing section 14a, whereby fluid flows through the flow path 13a. During the next period $T_1$ (from time $t_1$ to time $t_2$), the control section 17 opens the opening/closing section 14b and thereafter closes the opening/closing section 14a, whereby fluid flows through the flow path 13b. It should be noted that correction of the gain of the amplifying section in the measurement section 15b is completed before the opening/closing section 14b is opened. During next period $T_1$ (from time $t_2$ to time $t_3$), the control section 17 opens the opening/closing section 14c and thereafter closes the opening/closing section 14b, whereby fluid flows through the flow path 13c. It should be noted that correction of the gain of the amplifying section in the measurement section 15c is completed before the opening/closing section 14c is opened.

In this way, a flow path in which the flow rate has already been measured is switched with the passing of every predetermined period.

With this arrangement, even when the flow of fluid is maintained and the flow rate thereof is being measured, the gain of the amplifying section of the measurement section 15 in a flow path 13 in which an opening/closing section 14 is closed is corrected. Even when the gain in a flow path in which the flow rate is being measured is varied, especially, due to a secular change of a transducer, the flow path 13 is switched by the opening/closing sections 14, whereby measurement with high stability and without decreased reception sensitivity is achieved within a certain time interval, and a decrease in accuracy can be prevented.

(Embodiment 3)

Figure 5:
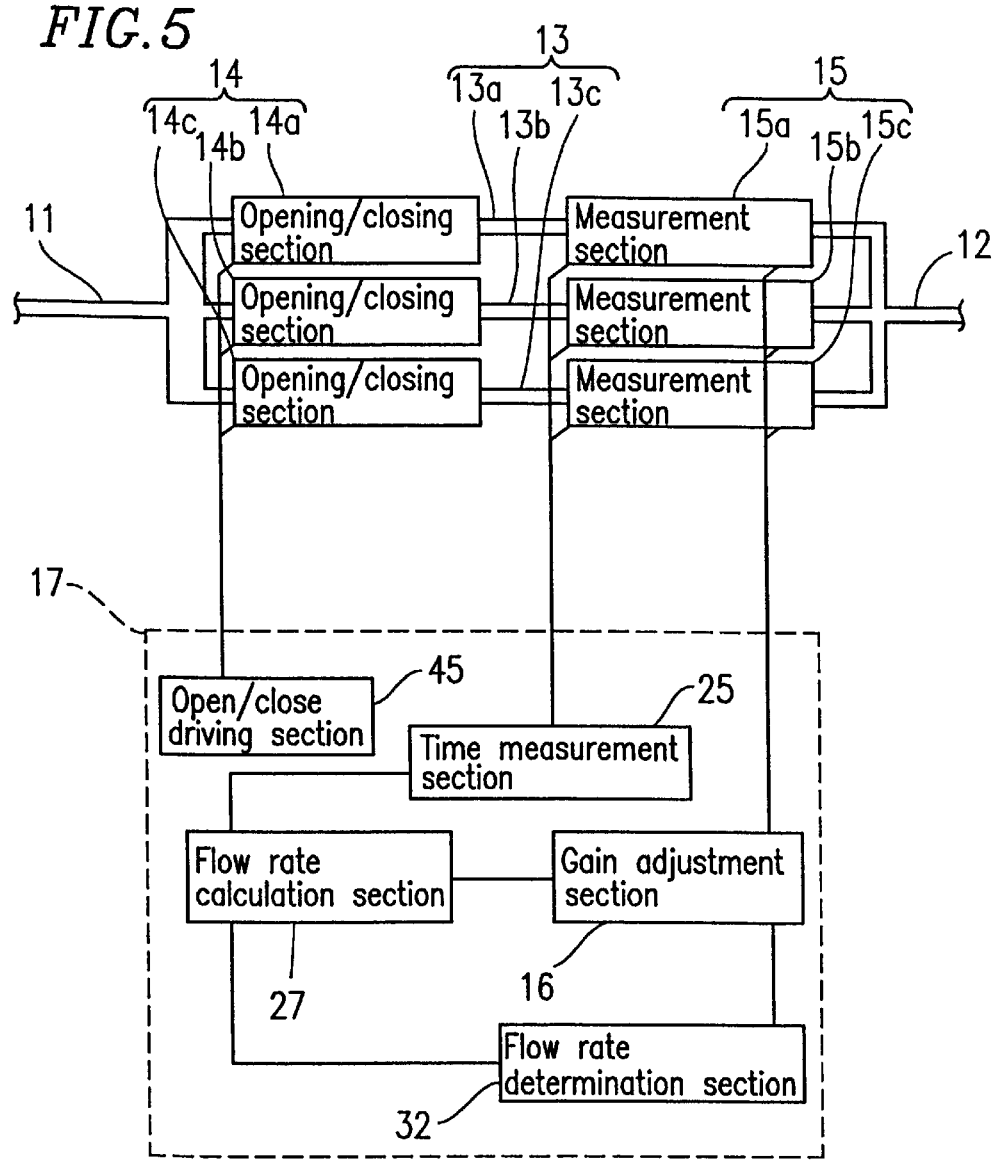
FIG. 5 is a block diagram showing a structure of a control section of a flow rate measurement apparatus according to embodiment 3 of the present invention.
Figure 6:
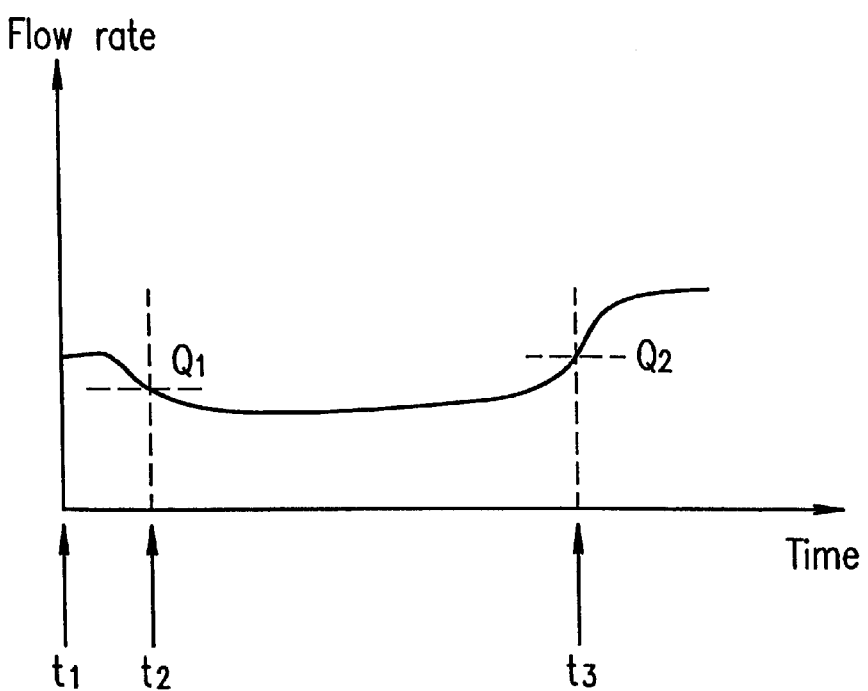
FIG. 6 is a flow rate characteristic graph for illustrating processing in the control section shown in FIG. 5.

Hereinafter, a flow rate measurement apparatus according to embodiment 3 of the present invention is described. The block diagrams of FIGS. 1A and 1B which have been used in embodiment 1 are used again to describe a structure of this embodiment. FIG. 5 is a block diagram showing a structure of the control section 17. FIG. 6 is a timing chart illustrating operations of the control section 17 based on a flow rate characteristic. Embodiment 3 is different from embodiments 1 and 2 in that the control section 17 includes a flow rate determination section 32. When the measured flow rate of the fluid is lower than a predetermined flow rate, the flow rate determination section 32 transmits to the gain adjustment section 16 a signal which directs the start of correction of the gain of the measurement section 15. When the measured flow rate of the fluid is higher than a predetermined flow rate, the flow rate determination section 32 transmits to the gain adjustment section 16 a signal which directs the stop of correction of the gain of the measurement section 15.

The control section 17 opens the opening/closing section 14a at time $t_1$, shown in FIG. 6. As a result, fluid flows through the flow path 13a. The flow rate calculation section 27 calculates the flow rate of the fluid flowing through the flow path 13a based on an output of the measurement section 15a. When the flow rate calculated by the flow rate calculation section becomes lower than a predetermined value ($Q_1$ at time $t_2$ shown in FIG. 6), the flow rate determination section 32 transmits a signal to the control section 17 such that the gains of the amplifying sections of the measurement sections 15b and 15c in the paths in which the opening/closing sections 14b and 14c are closed are corrected. This is because the probability that the opening/closing sections 14 is opened so as to allow the fluid to flow through the path 13b for measuring the flow rate by using a plurality of flow paths decreases along with the decrease of the flow rate. Furthermore, since the flow rate is low, and accordingly, the flow of the fluid is small, correction of the gain can be performed in a flow path 13 in which an opening/closing sections 14 is closed, without errors which may result from an external disturbance from downstream. In this embodiment, the correction of the gain is performed immediately after the flow rate becomes lower than value $Q_1$. However, considering that noise may be superposed on a flow rate signal, or that the flow rate itself may vary, correction of the gain may be started after a lapse of a certain time since the flow rate has become equal to or lower than value $Q_1$, whereby correction can be more stable.

When the flow rate calculated by the flow rate calculation section 27 becomes higher than a predetermined value ($Q_2$ at time $t_3$ shown in FIG. 6), the flow rate determination section 32 transmits a signal to the control section 17 such that an operation for correcting the gains of the amplifying sections of the measurement sections 15b and 15c in the paths in which the opening/closing sections 14b and 14c are closed is stopped. This is because the correction of the gain of the measurement section 15 can be affected by an external disturbance from downstream which may be caused due to the high flow rate. Furthermore, in preparation for a case where it is required to open the opening/closing sections for allowing the fluid to flow through the flow paths in order to measure a high flow rate, correction of the gain is stopped such that measurement of the flow rate can be immediately started.

(Embodiment 4)

Figure 7:
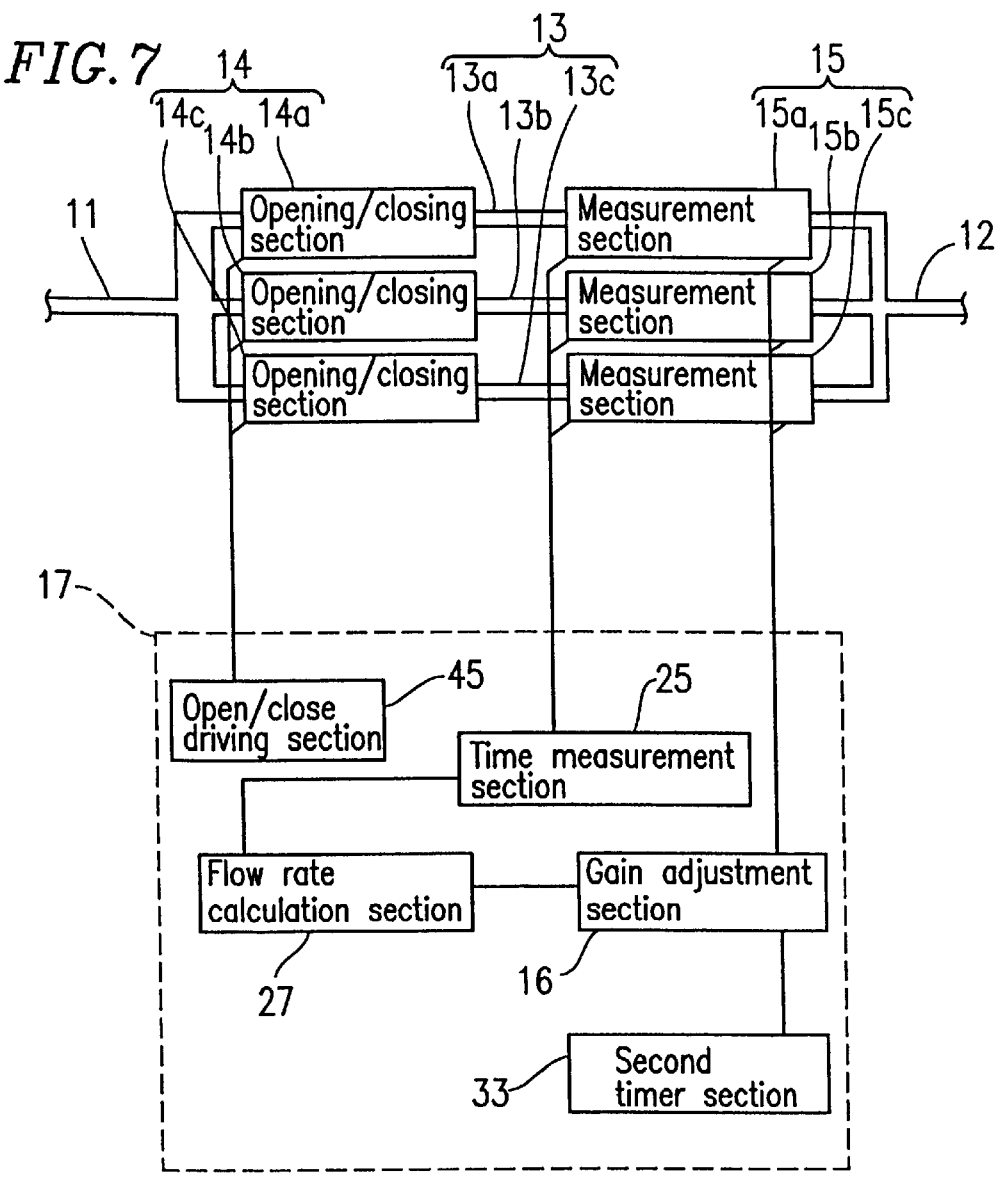
FIG. 7 is a block diagram showing a structure of a control section of a flow rate measurement apparatus according to embodiment 4 of the present invention.
Figure 8:
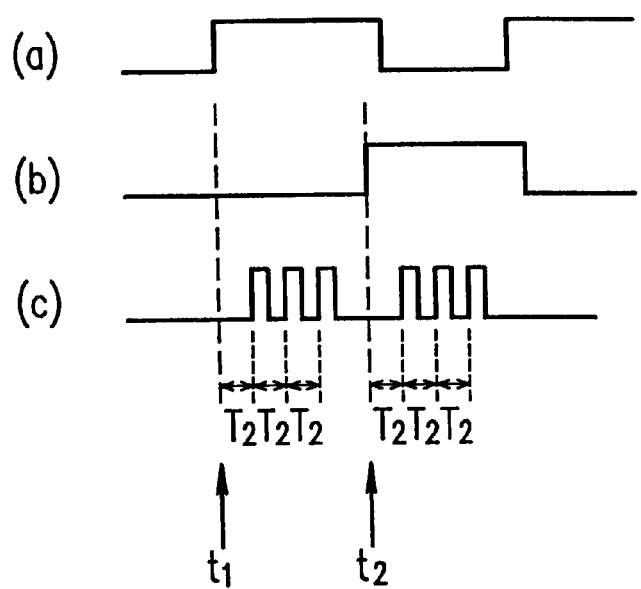
FIG. 8 is a timing chart illustrating operations of opening/closing sections 4a and 4b and a second timer section.

Hereinafter, a flow rate measurement apparatus according to embodiment 4 of the present invention is described. The block diagrams of FIGS. 1A and 1B which have been used in embodiment 1 are used again to describe a structure of this embodiment. FIG. 7 is a block diagram showing a structure of the control section 17. FIG. 8 is a timing chart illustrating operations of the control section 17. Embodiment 4 is different from embodiments 1, 2, and 3 in that the control section 17 includes a second timer section 33 for performing time management such that correction of the gain of the measurement section 15 in a closed flow path is performed at a predetermined time interval.

In FIG. 8, part (a) shows an operation of the opening/closing section 14a, part (b) shows an operation of the opening/closing section 14b, and part (c) shows an operation of the second timer section 33.

The second timer section 33 starts its operation at time $t_1$ show in FIG. 8. The second timer section 33 transmits a pulse signal to the control section 17 every time a predetermined time, shorter than a period when the opening/closing sections 14a–14c are open (herein, $T_2$), passes. In response to the pulse signal from the second timer section 33, the gain adjustment section 16 in the control section 17 corrects the gain of a measurement section provided in a closed flow path.

In the example illustrated in FIG. 8, during a period from time $t_1$ to time $t_2$, the opening/closing section 14a is open whereas the opening/closing sections 14b and 14c are close. In response to the pulse signal from the second timer section 33, the gain adjustment section 16 in the control section 17 corrects the gain of the measurement section 15b provided in the closed flow path 13b. Similarly, the gain adjustment section 16 in the control section 17 may correct the gain of the measurement section 15c provided in the closed flow path 13c, in response to the pulse signal from the second timer section 33.

At time $t_2$, the opening/closing section 14a is closed, and the opening/closing section 14b is opened. The second timer section 33 starts its operation at time $t_2$ so as to transmit a pulse signal to the control section 17 after every predetermined period (herein, $T_2$) passes. In response to the pulse signal from the second timer section 33, the gain adjustment section 16 in the control section 17 corrects the gain of the measurement section 15a provided in the closed flow path 13a.

Thus, according to this embodiment, the gain of a measurement section 15 in a path 13 in which an opening/closing section 14 is close can be corrected at an interval of a predetermined time interval $T_2$. Therefore, even when an error is caused in the gain due to secular changes including external disturbance, such as temperature, humidity, etc., such an error can be corrected within a predetermined time so as to reduce variations in measurement. Thus, the flow rate measurement apparatus of the present invention has a sufficient capacity to deal with a case where an abrupt increase in the flow rate occurs, and accordingly, it is required to open the closed flow paths.

(Embodiment 5)

Figure 9:
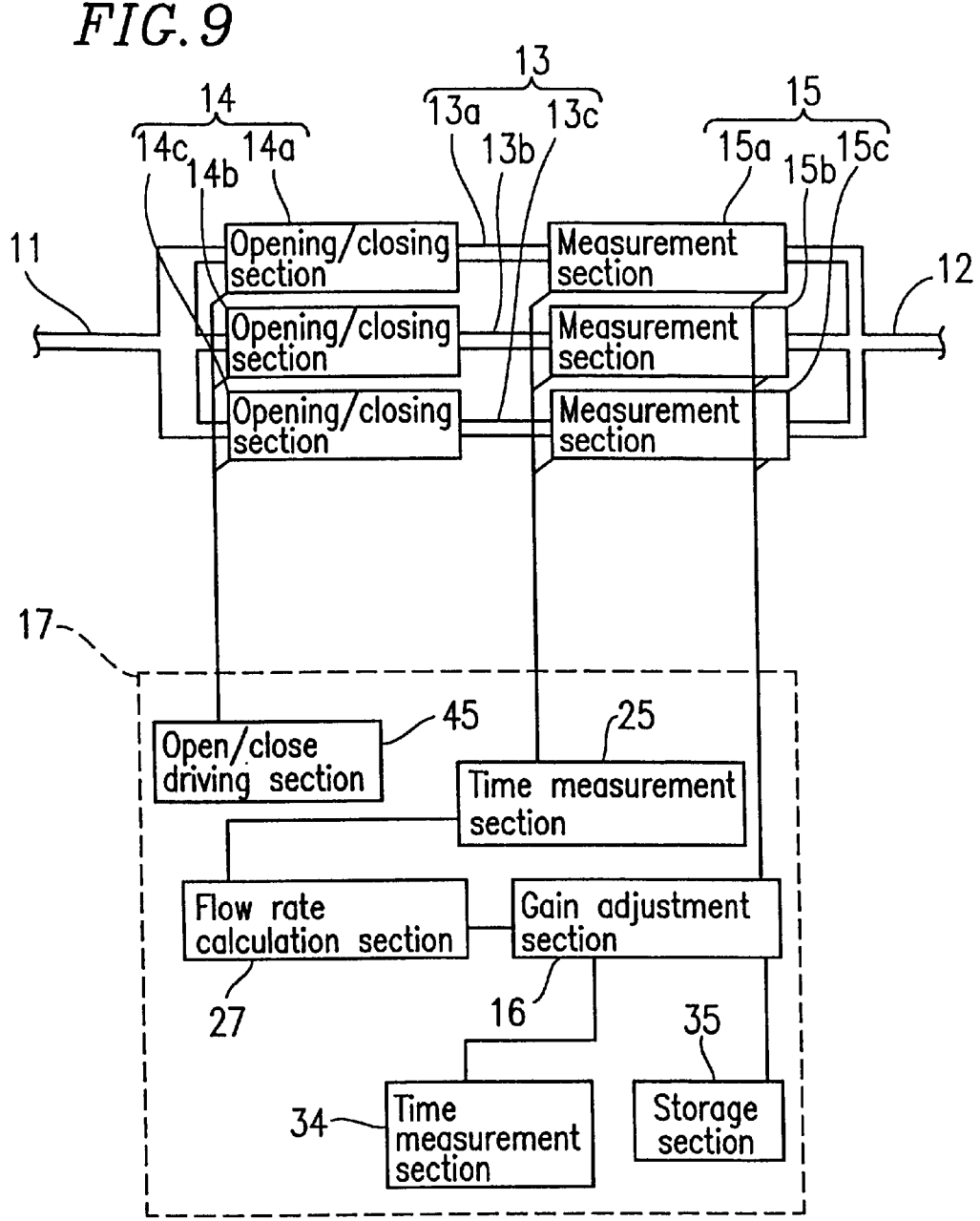
FIG. 9 is a block diagram showing a structure of a control section of a flow rate measurement apparatus according to embodiment 5 of the present invention.

Hereinafter, a flow rate measurement apparatus according to embodiment 5 of the present invention is described. The block diagrams of FIGS. 1A and 1B which have been used in embodiment 1 are used again to describe a structure of this embodiment. FIG. 9 is a block diagram showing a structure of the control section 17. Embodiment 5 is different from embodiments 1–4 in that the control section 17 includes a time measurement section 34 and a storage section 35.

The control section 17 opens a plurality of the opening/closing sections 14 so as to allow fluid to flow therethrough. In the meantime, the control section 17 corrects the gain of a measurement section 15 in a flow path in which an opening/closing section 14 is closed. The control section 17 has a time measurement section 34. The time measurement section 34 transmits a signal to the gain adjustment section 16 at a prescribed time such that the gain of the measurement section 15 in the closed flow path 13 is corrected. In such a structure, the state of the flow rate which is specific to a system in which the flow rate measurement apparatus is installed has been previously measured, and the gain is corrected, for example, at any time when the flow rate is low, whereby the accuracy of the measurement section 15 can be adjusted at an optimum time. Furthermore, the preset time may be statistically determined. For example, in the case of gas flow rate measurement equipment for household use, the preset time is any time within a day except for breakfast time, lunchtime, and a period from evening to night including a bath/shower time, i.e., any time during which gas (measured fluid) rarely flows. By previously setting the number of adjustment operations and times at which the adjustment is performed, the adjustment can be achieved with only a small correction error which may be caused in the gain.

The control section 17 includes the time measurement section 34 and the storage section 35. A time during which a stable flow rate Q, equal to or lower than a predetermined flow rate, is continuously maintained, is measured by the time measurement section 34 and stored in the storage section 35. An operation for correcting the gain of a measurement section 15 in a closed flow path is performed at the time stored in the storage section 35. The use conditions inherent to a system to which the flow rate measurement apparatus is attached and the state of the system are previously stored, and the state of the gain of the measurement section 15 is checked at a time when the flow rate is stable, whereby the measurement section 15 can be adjusted more accurately.

For example, assume a case where the present invention is applied to a gas flow rate meter for household use. The time for meals in the morning and around noon, a period from evening to night when a bath is used, a period when heating apparatuses are used, etc., are different among families according to their ways of life. Thus, the times when the flow rate measured by the measurement section 15 is equal to or lower than a predetermined value are examined, and by repeating this examination, such times are stored and learned. The control section 17 determines a time to correct the gain of the measurement section 15 by using the time measurement section 34. Furthermore, when a calendar function is provided, it is indicated that the total time during which gas is used is sometimes considerably different between a weekday and a day of the weekend. Such information can be incorporated in the storage section as a factor of determination. (Embodiment 6)

Figure 10:
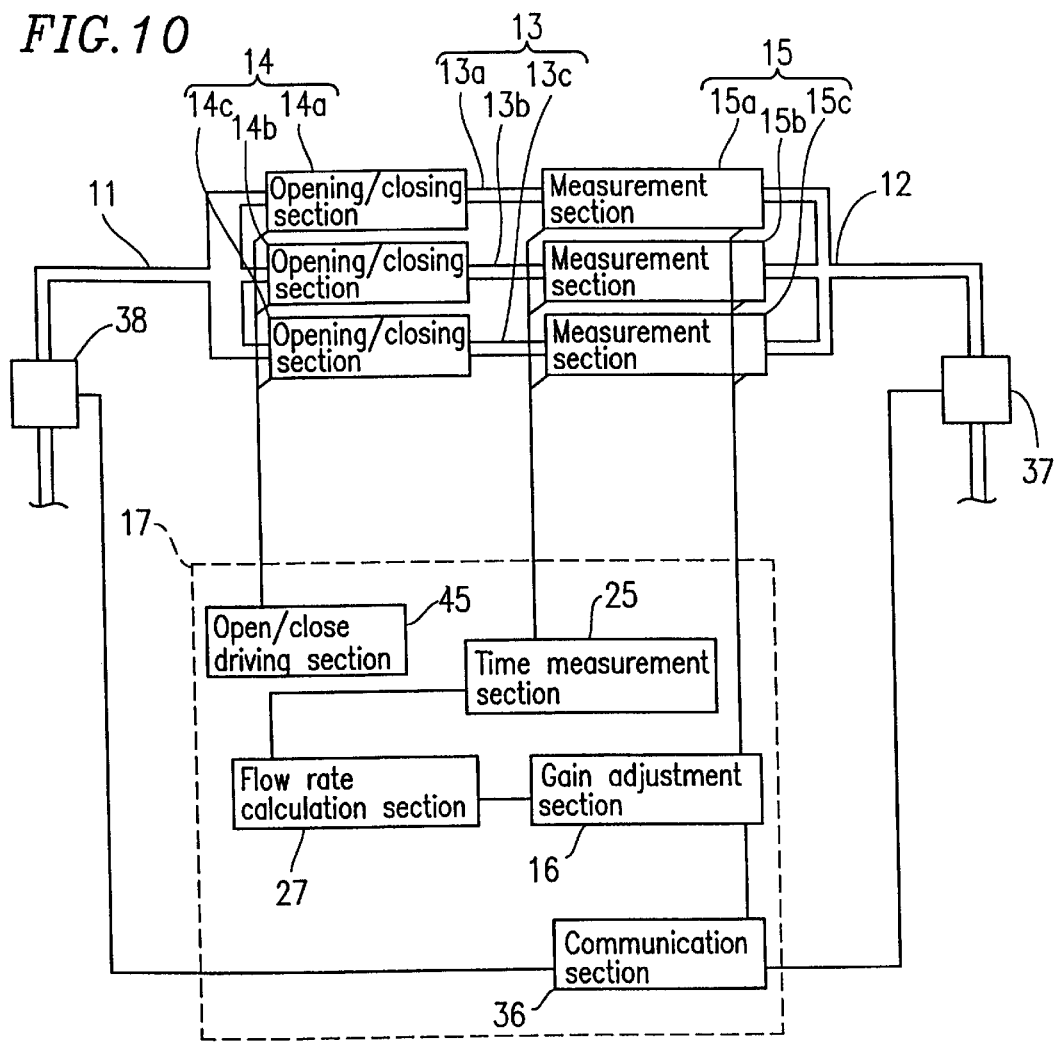
FIG. 10 is a block diagram showing a structure of a control section of a flow rate measurement apparatus according to embodiment 6 of the present invention.

Hereinafter, a flow rate measurement apparatus according to embodiment 6 of the present invention is described. The block diagrams of FIGS. 1A and 1B which have been used in embodiment 1 are used again to describe a structure of this embodiment. FIG. 10 is a block diagram showing a structure of the control section 17. Embodiment 6 is different from embodiments 1–5 in that the control section 17 includes a communication section 36.

In this embodiment, the control section 17 includes a communication section 36. Usually, the control section 17 opens a plurality of opening/closing sections 14 so as to allow the flow of fluid. In the meantime, the control section 17 corrects the gain of measurement sections 15 in paths in which opening/closing sections 14 are closed. The time to correct this gain may be automatically controlled by using, for example, the second timer section 33 (FIG. 7) incorporated in the control section 17 or the like. However, in some cases, a user or an external institution requests a confirmation operation at any time. In preparation for such a case, the communication section 36 of FIG. 10 is provided such that the flow rate measurement apparatus can communicate with an external party. The user directs the start of the confirmation operation by using setting means, such as a switch or a remote controller, and in response to this direction signal, the control section 17 corrects the gain of the measurement sections 15 in paths in which the opening/closing sections 14 are closed. With such a structure, a user can correct the gain of a measurement section externally at any time. Thus, even when a system becomes unstable due to a sudden external disturbance or the like, a user can manually transmits a signal for correcting the gain.

Furthermore, as an external signal source for generating a signal that requests correction of the gain, equipment installed in a downstream portion of the flow path can be used. For example, if it is a gas apparatus, a gas water heater 37 or the like can be used. A gas measurement section, or the like, included in the gas apparatus estimates the gas flow rate. When the gas measurement section determines that the gas flow rate is equal to or lower than a predetermined value, the gas measurement section sends a request for gain correction through the communication section 36 to the control section 17 of the flow rate measurement apparatus. With such an arrangement, the gain correction can be reliably performed by externally supplying a signal when the flow rate of fluid is low. Similarly, as an external signal source, equipment installed in an upstream portion of the inflow path 11, for example, a flow rate measurement section 38 in an output section of a large supply plant, may be used. When the flow rate measurement section determines that the amount of flowing fluid is equal to or lower than a predetermined amount, the flow rate measurement section sends a request for gain correction through the communication section 36 to the control section 17 of the flow rate measurement apparatus. With this arrangement, the gain correction can be reliably performed by externally supplying a signal when the flow rate of fluid is low. The externally-supplied signal may be supplied from an apparatus including a timer section or from a central meter to which apparatuses are connected. With this structure, correction of the gain can be externally requested within a certain time.

It is apparent that some of embodiments 1–6 described hereinabove can be combined. When unnecessary gain correction is omitted by performing gain correction only when the value of the flow rate calculation section indicates an abnormal value, power consumption is reduced. In another embodiment, when the flow rate is equal to or smaller than a predetermined flow rate value, this is considered as a change in the gain, and accordingly, gain correction is performed so as to deal with a very small leakage of fluid. Such an embodiment can be readily practiced by those skilled in the art. Furthermore, a plurality of flow paths are used so as to measure the flow rate of fluid over a wide range of a very low flow rate to a large flow rate, and to correct the gain of a measurement section in a closed flow path. In this manner, the flow rate measurement can always be performed with high accuracy. Furthermore, a periodical operation of an opening/closing section can prevent itself from being stuck to the flow path, and the reliability of the measurement apparatus can be improved.

(Embodiment 7)

Figure 11A:
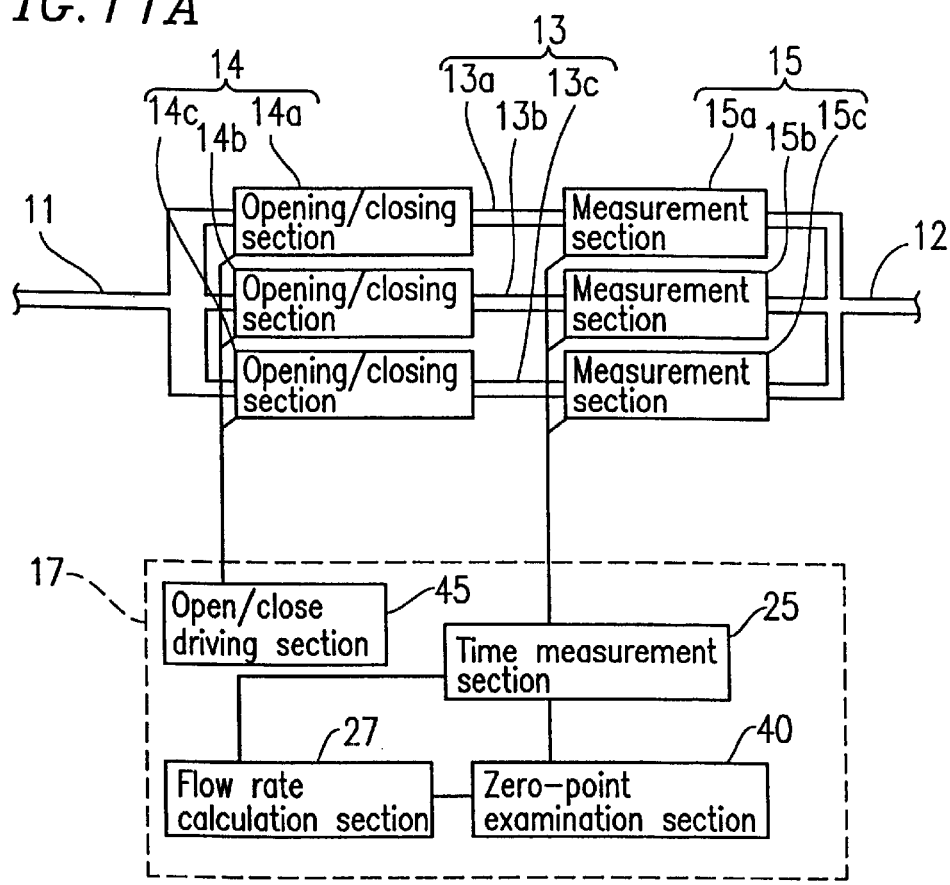
FIG. 11A is a block diagram showing a structure of a flow rate measurement apparatus according to embodiment 7 of the present invention.
Figure 11B:
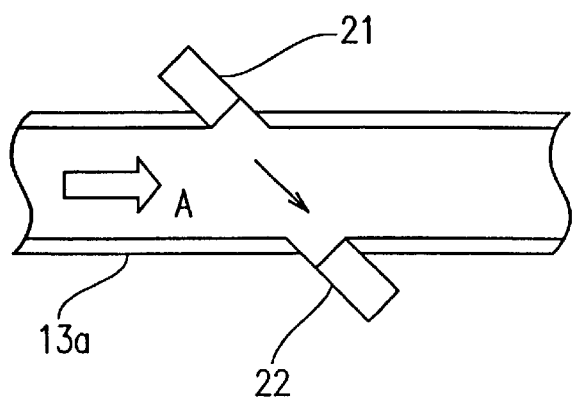
FIG. 11B is a diagram schematically showing a structure of a flow rate detecting section of the flow rate measurement apparatus shown in FIG. 11A.
Figure 12:
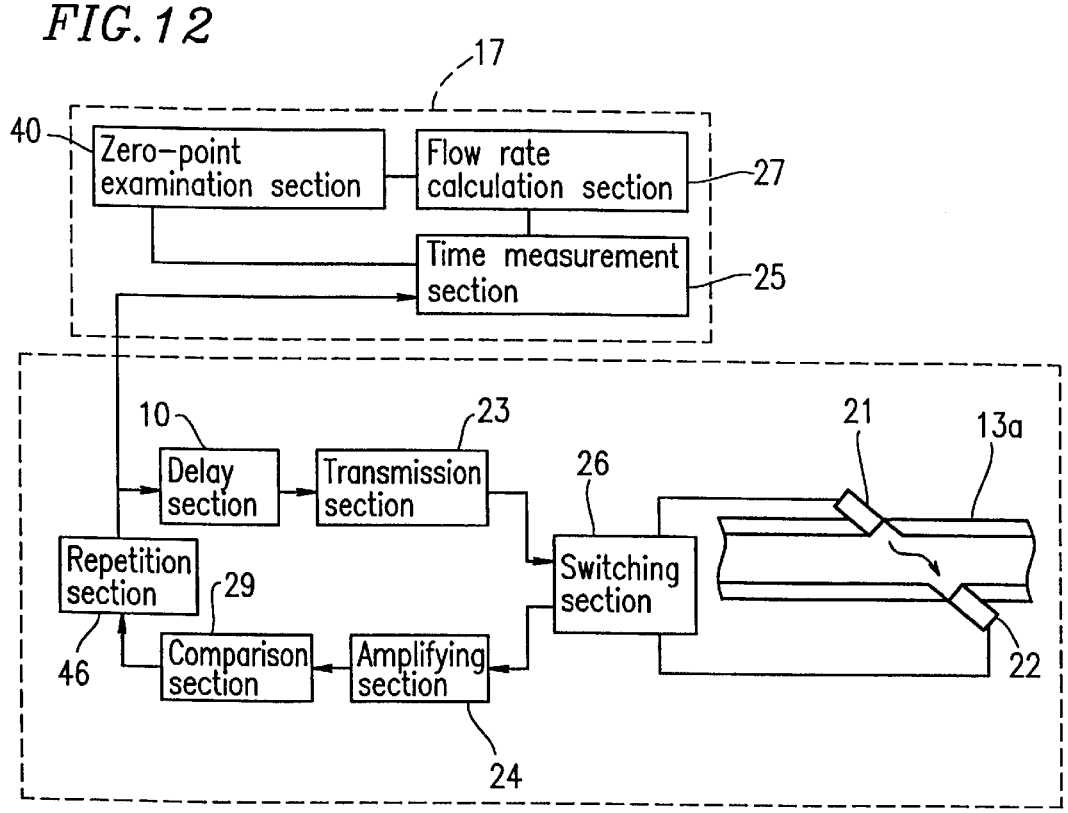
FIG. 12 is a block diagram showing a structure of a measurement section of the flow rate measurement apparatus shown in FIG. 11A.

FIG. 11A is a block diagram showing a structure of a flow rate measurement apparatus according to embodiment 7 of the present invention. FIG. 11B is a diagram schematically showing a structure of a measurement section shown in FIG. 11A. FIG. 12 is a block diagram showing a structure of the measurement section shown in FIG. 11A.

In FIGS. 11A and 11B, like elements are indicated by like reference numerals used in FIGS. 1A and 1B, and detailed descriptions thereof are omitted. A control section 17 shown in FIG. 11A includes a zero-point examination section 40.

The control section 17 controls the opening/closing of opening/closing sections 14a–14c while performing a flow rate calculation similar to that described with reference to FIGS. 1A and 1B. When the opening/closing section 14a is close, fluid does not flow through a flow path 13a. In this case, the flow rate measured by a measurement section 15a must be 0. The zero-point of the measurement section 15a is sometimes off of a correct point due to external disturbance, such as temperature, and variation in temperature, secular change, etc., in a flow rate calculation section 27. In such a case, the flow rate measured by the measurement section 15a is not necessarily 0. The zero-point examination section 40 in the control section 17 detects, based on a value of the flow rate calculation section 27, the zero-point of the measurement section 15a provided in the flow path 13a in which the opening/closing section 14a is close so as to perform a zero-point correction. This zero-point correction is achieved, for example, by using a value measured by the measurement section 15a when the opening/closing section 14a is closed as a reference value (value which should be obtained when the flow rate is zero, i.e., zero-point) and increasing or decreasing a value measured by the measurement section 15a when the opening/closing section 14a is next opened by the reference value. This zero-point correction can be performed in a measurement section 15 provided in each of flow paths 13 in which opening/closing sections 14 are close.

In this correction, if the zero-point is far off of a correct point, it is effective to notify a user about the abnormal condition by using announcement means or the like. Moreover, it is also effective to notify an external administrative person about the abnormal condition by using communication means or the like so that the abnormal condition can be corrected in an earlier phase.

The flow paths 13 may be formed by a plurality of flow paths having the same cross-sectional area such that the application range of the flow rate measurement apparatus is increased, and maintenance thereof is facilitated. Alternatively, the flow paths 13 may be formed by a plurality of flow paths having different cross-sectional areas so that an optimum path is selected according to the flow rate or the like. In the example of the present invention, three flow paths are provided, but this number is not especially significant. Any number of flow paths can be provided so long as it is two or more.

FIG. 11B shows a portion of a structure of the measurement section 15a provided in the flow path 13a shown in FIG. 11A. It should be noted that each of the measurement sections 15b and 15c has the same structure as that of the measurement section 15a.

An empty arrow A shown in FIG. 11B indicates a direction in which fluid flows in the flow path 13a. The measurement section 15a includes a first transducer 21 and a second transducer 22 provided in the flow path 13a. The first transducer 21 and the second transducer 22 are placed so as to face each other across the fluid flowing through the flow path 13a. The first transducer 21 and the second transducer 22 transmit and receive ultrasonic wave signals.

FIG. 12 shows a structure of the measurement section 15a provided in the flow path 13a shown in FIG. 11A in more detail. It should be noted that each of the measurement sections 15b and 15c has the same structure as that of the measurement section 15a.

As shown in FIG. 12, the measurement section 15a includes a transmission section 23 for transmitting a periodic driving signal to the first transducer 21 and the second transducer 22; an amplifying section 24 for amplifying a received ultrasonic signal; a comparison section 29 for comparing a signal output from the amplifying section 24 and a reference signal, a repetition section 46 for receiving a signal output from the comparison section 29, setting a number of repetitions when a detected signal is equal to or greater than the reference signal, and repeating transmission of ultrasonic waves between the first transducer 21 and the second transducer 22 for the set number of repetitions; and a delay section 10 for delaying the transmission of ultrasonic waves during the repetition.

The zero-point examination section 40 includes a storage section (not shown) and an increase/decrease section (not shown). A value measured by the measurement section 15a when the opening/closing section 14a is close is stored in the storage section as a reference value (value which should be obtained when the flow rate is zero, i.e., zero-value). The increase/decrease section increases or decreases a value which is measured by the measurement section 15a when the opening/closing section 14a is next opened and fluid actually flows through the path 13a, by the reference value.

For example, in the case where the value measured by the measurement section 15a when the opening/closing section 14a is closed (zero-value) is 5 liters, and the value which is measured by the measurement section 15a when the opening/closing section 14a is next opened and the fluid actually flows through the path 13a is 15 liters, the increase/decrease section performs a subtraction: 15−5=10. In the case where the value measured by the measurement section 15a when the opening/closing section 14a is closed (zero-value) is −5 liters, and the value measured by the measurement section 15a when the opening/closing section 14a is next opened and the fluid actually flows through the path 13a is 15 liters, the increase/decrease section performs an addition: 15−(−5)=15+5=20.

In this way, the zero-point examination section 40 detects the zero-value of the measurement section 15, and a value measured by the measurement section 15 is corrected based on the detected zero-value, whereby the zero-value correction is achieved.

When the comparison section 29 detects that a signal equal to or greater than the reference signal is output from the amplifying section 24, the comparison section 29 outputs to the repetition section 46 a signal indicating the arrival of a received signal. The repetition section 46 receives a signal output from the comparison section 29 and determines whether or not the number of times this signal is received has reached the repetition number. When the number of times this signal is received has reached the predetermined repetition number, the repetition section 46 controls the transmission section 23 such that an ultrasonic wave signal is transmitted from the transmission section 23 through the delay section 10 for delaying the signal by a predetermined time. In this way, the ultrasonic wave signal is repeatedly transmitted from the transmission section 23.

A switching section 26 switches between transmission/reception of the first transducer 21 and the second transducer 22. Specifically, ultrasonic wave transmission where the first transducer 21 transmits an ultrasonic wave signal and the second transducer 22 receives the ultrasonic wave signal is repeated for the set number of repetitions. Thereafter, ultrasonic wave transmission where the second transducer 22 transmits an ultrasonic wave signal and the first transducer 21 receives the ultrasonic wave signal is repeated for the set number of repetitions.

A time measurement section 25 calculates a time spent for repeating the ultrasonic wave transmission from the first transducer 21 to the second transducer 22 for the set number of repetitions (first transmission time) and a time for repeating the ultrasonic wave transmission from the second transducer 22 to the first transducer 21 for the set number of repetitions (second transmission time).

For example, the time measurement section 25 is a timer counter.

The flow rate calculation section 27 calculates the velocity of fluid based on the time difference between the first transmission time and the second transmission time and calculates the flow rate of the fluid based on the cross-sectional area of the flow path 13 and the velocity of the fluid.

Thus, ultrasonic waves are utilized in the measurement section so as to measure the flow rate without causing a disturbance in the flow of the fluid. Moreover, due to the available combinations of a plurality of flow paths, the flow rate can be quickly measured with high accuracy over a wide flow rate range.

However, offset is sometimes caused in the first transducer 21, the second transducer 22, and the control section 17 due to external disturbances, such as a temperature or the like, a secular change, etc. Thus, it is probable that the control section 17 erroneously determines, in response to a received signal, that fluid is flowing through a flow path when none is flowing therethrough.

In order to prevent such a phenomenon, the zero-point examination section 40 corrects the zero-point of the measurement section 15 in a path through which fluid is not flowing.

When this operation is performed, immediately after the opening/closing section 14a is opened, the measurement section 15a can quickly start a measurement operation. Even if there is a transducer, a measurement section, a control section, or the like, whose offset cannot be amended, the measurement can be continued by excluding the flow path which includes such a defective element and opening another flow path.

In the above example, ultrasonic elements are used in the measurement section, but the present invention is not limited thereto. Similar measurement of flow rate can be achieved by using, as the measurement section, a heat radiation section which utilizes a power source provided in a flow path as a drive source; at least one thermosensitive section for detecting a change in temperature caused according to the flow rate; and a flow rate calculation section for calculating the flow rate based on a change in a signal in the thermosensitive section.

However, the sensitivities of the heat radiation section and the thermosensitive section may also be decreased due to external disturbances, such as a temperature or the like, a secular change, etc. Thus, it is probable that in the amplifying section 24 for amplifying a received signal, the gain of the received signal is not sufficient so that the flow rate cannot be measured. In order to prevent such a phenomenon, in a path through which fluid is not flowing, the gain adjustment section 16 corrects the gain of the amplifying section 24 and adjusts a signal so as to have an amplitude determinable by the comparison section 29. When this operation is performed, immediately after the opening/closing section 14a is opened, the measurement section 15a can quickly start a measurement operation. Even if there is a heat radiation section or a thermosensitive section whose sensitivity cannot be restored, the measurement can be continued by excluding the flow path which includes such a defective element and opening another flow path. Furthermore, the same effects can be obtained by adjusting the power supplied to the heat radiation section.

(Embodiment 8)

Figure 13:
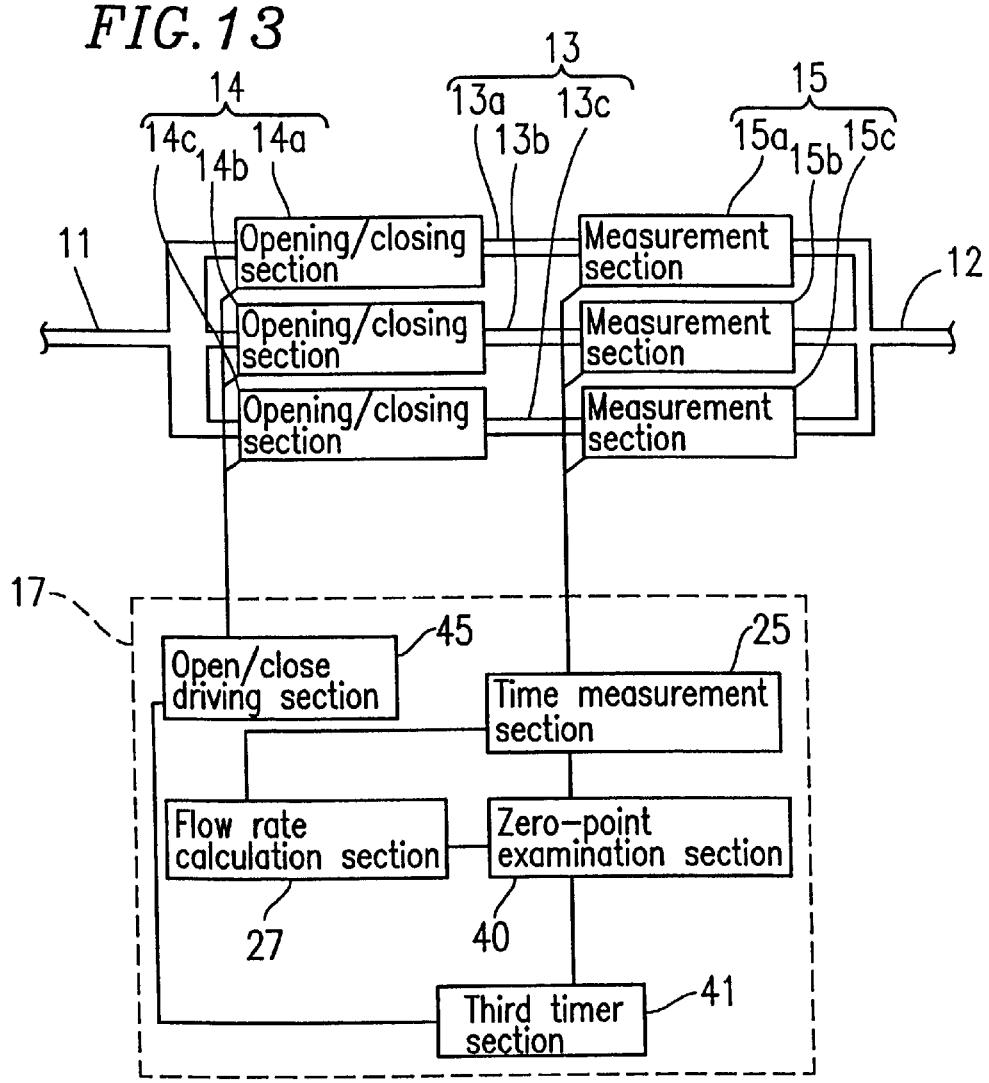
FIG. 13 is a block diagram showing a structure of a control section of a flow rate measurement apparatus according to embodiment 8 of the present invention.
Figure 14:
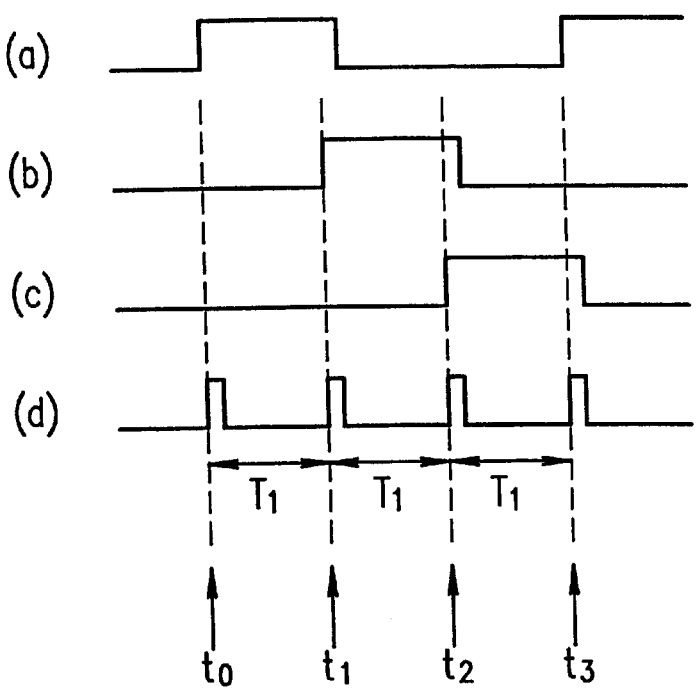
FIG. 14 is a timing chart illustrating operations of opening/closing sections 14a–14c and a third timer section.

Hereinafter, a flow rate measurement apparatus according to embodiment 8 of the present invention is described. The block diagrams of FIGS. 11A and 11B which have been used in embodiment 7 are used again to describe a structure of this embodiment. In this embodiment, like elements are indicated by like reference numerals used in embodiment 7, and detailed descriptions thereof are omitted. FIG. 13 is a block diagram showing a structure of the control section 17. FIG. 14 is a timing chart illustrating operations of the control section 17.

Embodiment 8 is different from embodiment 7 in that the control section 17 includes a third timer section 41 for performing time management such that the opening/closing sections 14 are switched at a predetermined time interval.

In FIG. 14, part (a) shows an operation of the opening/closing section 14a, part (b) shows an operation of the opening/closing section 14b, part (c) shows an operation of the opening/closing section 14c, and part (d) shows an operation of the third timer section 41.

The third timer section 41 starts its operation simultaneously with the opening of the opening/closing section 14a. The third timer section 41 transmits a pulse signal to the control section 17 every predetermined time period (herein, $T_1$). The control section 17 switches an opening/closing section so as to be opened based on the pulse signal from the third timer section 41. During the first period $T_1$ (from time $t_0$ to time $t_1$), the control section 17 opens the opening/closing section 14a, whereby fluid flows through the flow path 13*a*. During the next period T$_1$ (from time t$_1$ to time t$_2$), the control section 17 opens the opening/closing section 14*b* and thereafter closes the opening/closing section 14*a*, whereby fluid flows through the flow path 13*b*. It should be noted that zero-point correction for the measurement section 15*b* is completed before the opening/closing section 14*b* is opened. During the next period T$_1$ (from time t$_2$ to time t$_3$), the control section 17 opens the opening/closing section 14*c* and thereafter closes the opening/closing section 14*b*, whereby fluid flows through the flow path 13*c*. It should be noted that zero-point correction for the measurement section 15*c* is completed before the opening/closing section 14*c* is opened.

In this way, a flow path in which the flow rate is measured is switched with the passing of every predetermined period.

With this arrangement, even during when the flow of fluid is kept and the flow rate thereof is being measured, the zero-point correction is performed for a measurement section 15 in a flow path 13 in which an opening/closing section 14 is closed. Even when the zero-point in a flow path in which measurement is being performed is shifted from a correct point due to a secular change, the flow path 13 is switched by the opening/closing sections 14, whereby measurement with high stability and without a shifted zero-point is achieved within a certain time interval, and a decrease in accuracy can be prevented.

(Embodiment 9)

Figure 15:
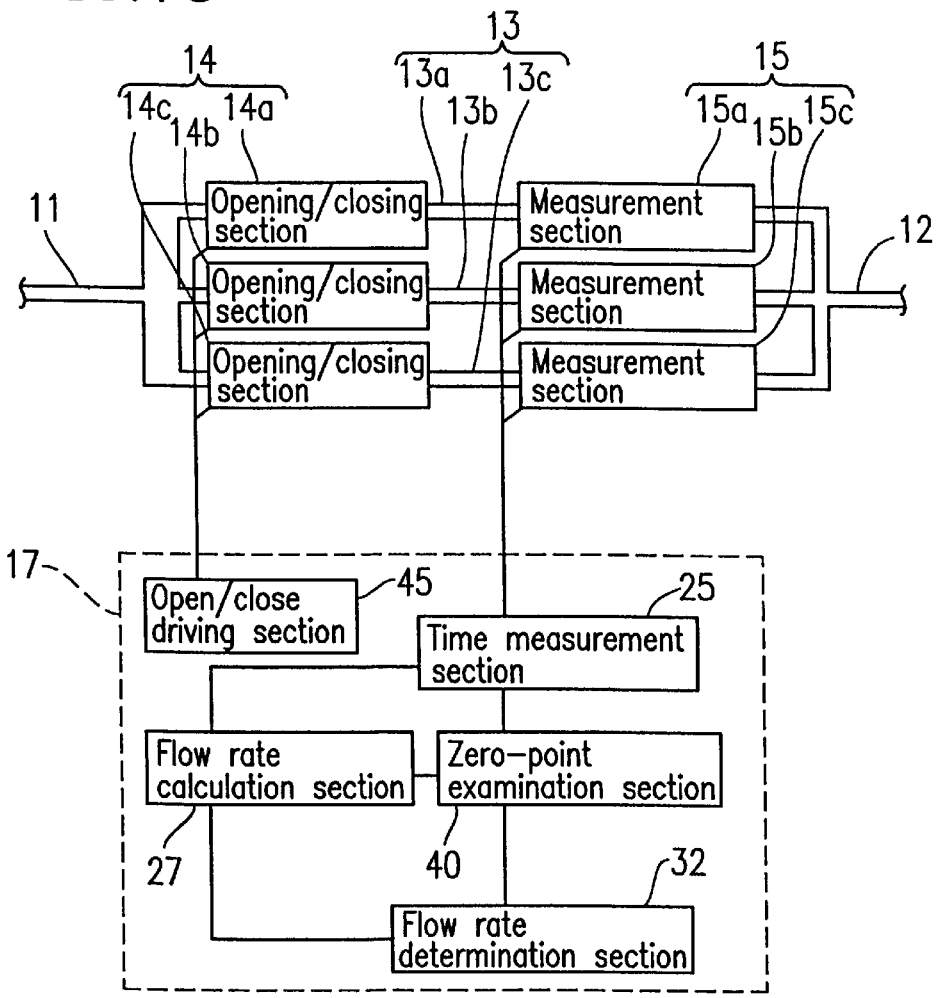
FIG. 15 is a block diagram showing a structure of a control section of a flow rate measurement apparatus according to embodiment 9 of the present invention.
Figure 16:
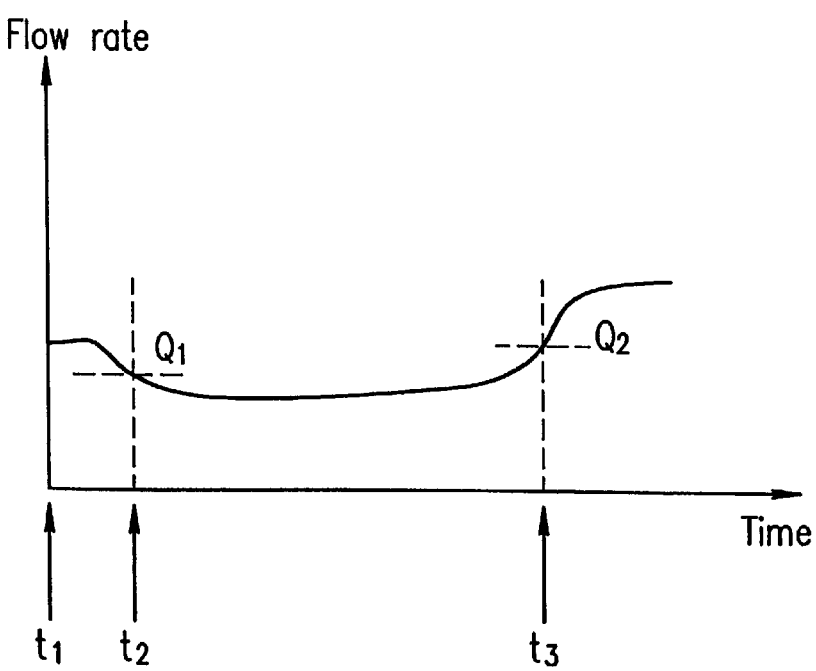
FIG. 16 is a timing chart illustrating processing in the control section shown in FIG. 15.

Hereinafter, a flow rate measurement apparatus according to embodiment 9 of the present invention is described. The block diagrams of FIGS. 11A and 11B which have been used in embodiment 7 are used again to describe a structure of this embodiment. In this embodiment, like elements are indicated by like reference numerals used in embodiment 7, and detailed descriptions thereof are omitted. FIG. 15 is a block diagram showing a structure of the control section 17. FIG. 16 is a timing chart illustrating operations of the control section 17. Embodiment 9 is different from embodiments 7 and 8 in that the control section 17 includes a flow rate determination section 32. When the measured flow rate of the fluid is lower than a predetermined flow rate, the flow rate determination section 32 transmits to the zero-point examination section 40 a signal which directs the start of zero-value correction of the measurement section 15. When the measured flow rate of the fluid is higher than a predetermined flow rate, the flow rate determination section 32 transmits to the zero-point examination section 40 a signal which directs the stop of zero-value correction of the measurement section 15.

The control section 17 opens the opening/closing section 14*a* at time t$_1$ shown in FIG. 16. As a result, fluid flows through the flow path 13*a*. The flow rate calculation section 27 calculates the flow rate of the fluid flowing through the flow path 13*a* based on an output of the measurement section 15*a*. When the flow rate calculated by the flow rate calculation section 27 becomes lower than a predetermined value (Q$_1$ at time t$_2$ shown in FIG. 16), the flow rate determination section 32 transmits a signal to the control section 17 such that the zero-points of the measurement sections 15*b* and 15*c* in the paths in which the opening/closing sections 14*b* and 14*c* are closed are corrected. This is because the probability that the opening/closing sections 14 are opened so as to allow the fluid to flow through the path 13*b* for measuring the flow rate by using a plurality of flow paths decreases along with the decrease of the flow rate. Furthermore, since the flow rate is low, and accordingly, the flow of the fluid is small, examination of the zero-point can be performed in a flow path 13 in which an opening/closing sections 14 is closed, without causing an error which may result from an external disturbance from downstream. In this embodiment, examination of the zero-point is performed immediately after the flow rate becomes lower than value Q$_1$. However, considering that noise may be superposed on a flow rate signal, or that the flow rate itself may vary, the examination of the zero-point may be started after a lapse of a certain time since the flow rate has become equal to or lower than value Q$_1$, whereby correction, can be more stable.

When the flow rate calculated by the flow rate calculation section 27 becomes higher than a predetermined value (Q$_2$ at time t$_3$ shown in FIG. 16), the flow rate determination section 32 transmits a signal to the control section 17 such that an operation for correcting the zero-points of the measurement sections 15*b* and 15*c* in the paths in which the opening/closing sections 14*b* and 14*c* are closed is stopped. This is because the zero-point correction of the measurement section 15 can be affected by an external disturbance from downstream which may be caused due to the high flow rate. Furthermore, in preparation for a case where it is required to open the opening/closing sections for allowing the fluid to flow through the flow paths in order to measure a high flow rate, the zero-point examination is stopped such that measurement of the flow rate can be immediately started.

(Embodiment 10)

Figure 17:
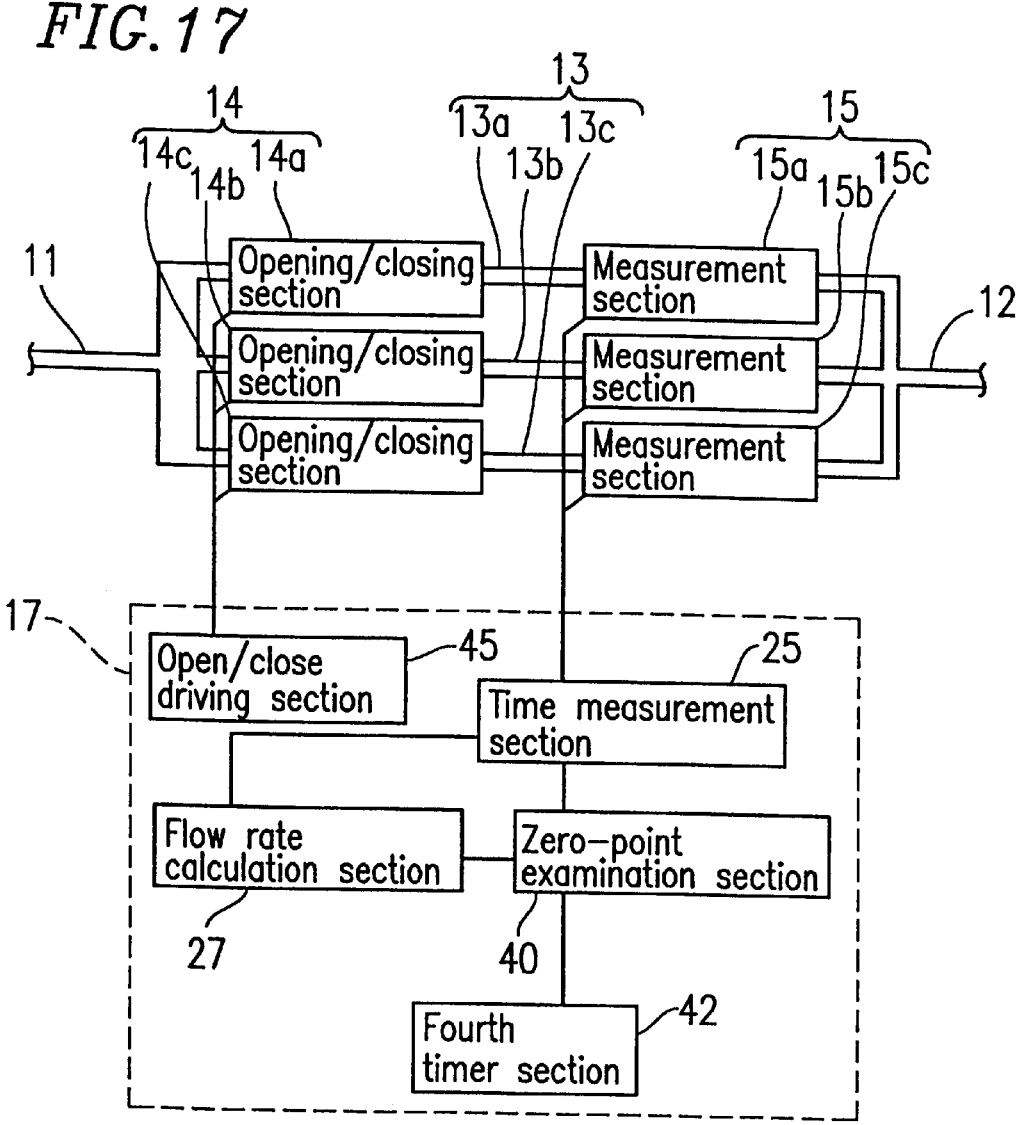
FIG. 17 is a block diagram showing a structure of a control section of a flow rate measurement apparatus according to embodiment 10 of the present invention.
Figure 18:
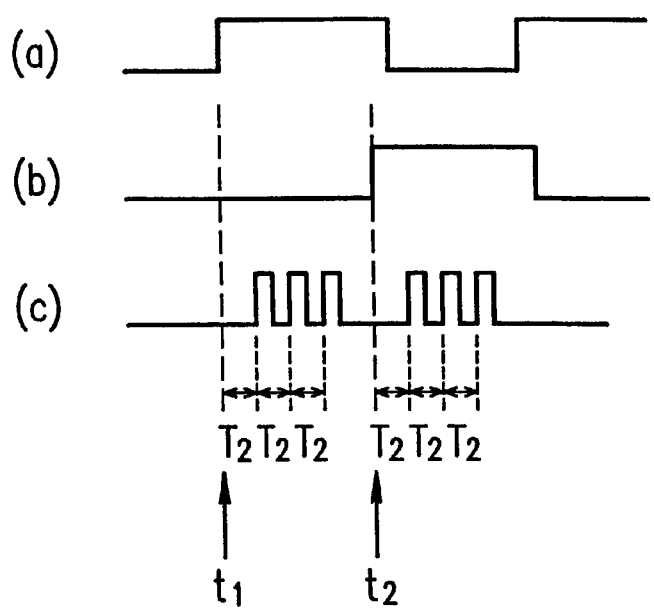
FIG. 18 is a timing chart illustrating operations of opening/closing sections 14a and 14b and a fourth timer section.
Figure 19:
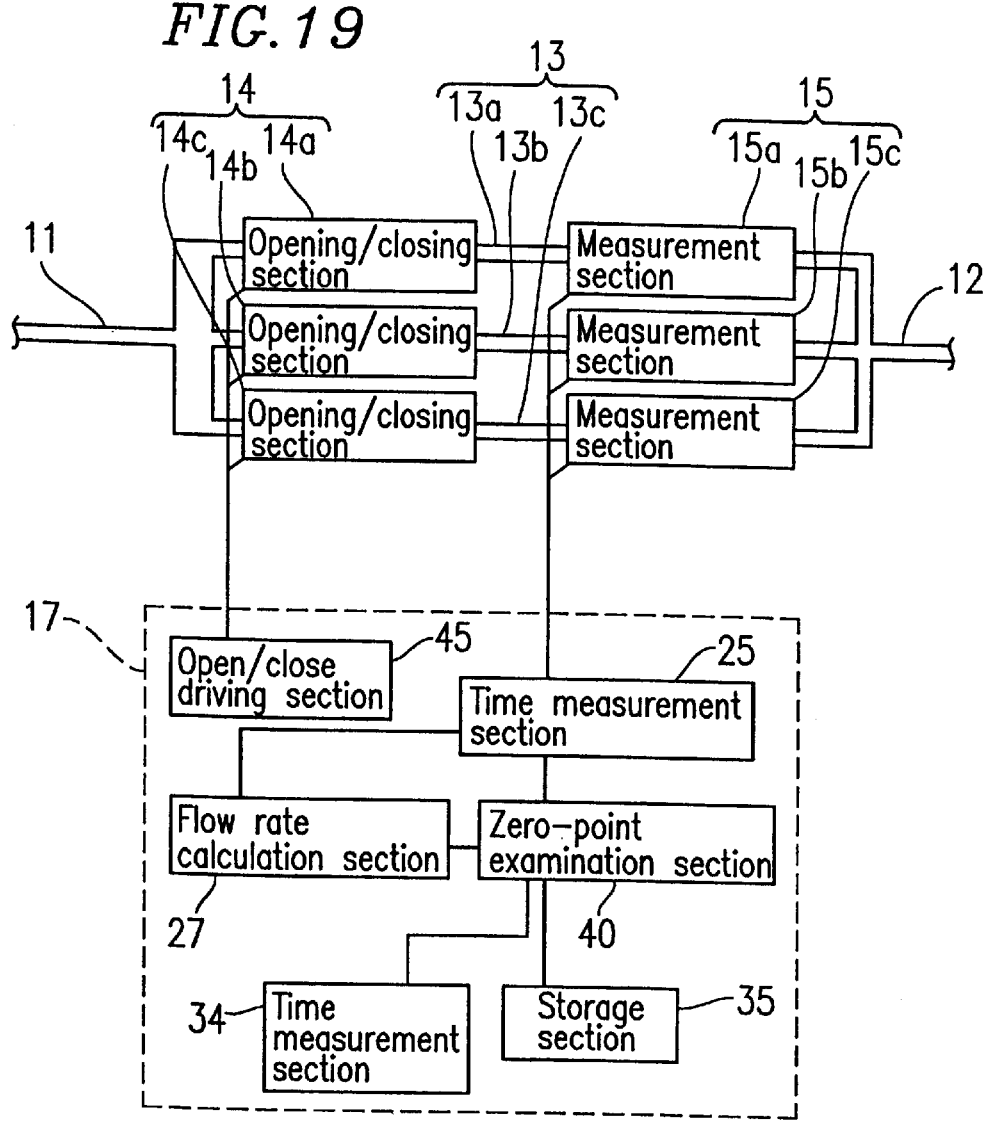
FIG. 19 is a block diagram showing a structure of a control section of a flow rate measurement apparatus according to embodiment 11 of the present invention.

Hereinafter, a flow rate measurement apparatus according to embodiment 10 of the present invention is described. The block diagrams of FIGS. 11A and 11B which have been used in embodiment 7 are used again to describe a structure of this embodiment. In this embodiment, like elements are indicated by like reference numerals used in embodiment 7, and detailed descriptions thereof are omitted. FIG. 17 is a block diagram showing a structure of the control section 17. FIG. 18 is a timing chart illustrating operations of the control section 17. Embodiment 10 is different from embodiment 7, embodiment 8, and embodiment 9 in that the control section 17 includes a fourth timer section 42 for performing time management such that the zero-point of a measurement section in a closed flow path is corrected at a predetermined time interval.

In FIG. 18, part (a) shows an operation of the opening/closing section 14*a*, part (b) shows an operation of the opening/closing section 14*b*, and part (a) shows an operation of the fourth timer section 42.

The fourth timer section 42 starts its operation at time t$_1$ show in FIG. 18. The fourth timer section 42 transmits a pulse signal to the control section 17 every time a predetermined time shorter than a period when the opening/closing sections 14*a*–14*c* are open (herein, T$_2$) passes. In response to the pulse signal from the fourth timer section 42, the zero-point examination section 40 in the control section 17 examines the zero-point of a measurement section provided in a closed flow path.

In the example illustrated in FIG. 18, during a period from time t$_1$ to time t$_2$, the opening/closing section 14*a* is open whereas the opening/closing sections 14*b* and 14*c* are close. In response to the pulse signal from the fourth timer section 42, the zero-point examination section 40 in the control section 17 examines the zero-point of the measurement section 15*b* provided in the closed flow path 13*b*. Similarly, the zero-point examination section 40 in the control section 17 may examine the zero-point of the measurement section 15*c* provided in the closed flow path 13*c*, in response to the pulse signal from the fourth timer section 42.

At time t$_2$, the opening/closing section 14*a* is closed, and the opening/closing section 14*b* is opened. The fourth timer section 42 starts its operation at time $t_2$ so as to transmit a pulse signal to the control section 17 every time a predetermined period (herein, $T_2$) passes. In response to the pulse signal from the fourth timer section 42, the zero-point examination section 40 in the control section 17 examines the zero-point of the measurement section 15a provided in the closed flow path 13a.

Thus, according to this embodiment, the zero-point of a measurement section 15 in a path 13 in which an opening/closing section 14 is close can be corrected at an interval of a predetermined time interval $T_2$. Therefore, even when the zero-point is shifted due to secular changes including external disturbance, such as temperature, humidity, etc., such a shift can be amended within a predetermined time so as to reduce variations in measurement. Thus, the flow rate measurement apparatus of the present invention has a sufficient capacity to deal with a case where an abrupt increase in the flow rate occurs, and accordingly, it is required to open the closed flow paths.

(Embodiment 11)

Hereinafter, a flow rate measurement apparatus according to embodiment 11 of the present invention is described. The block diagrams of FIGS. 11A and 11B which have been used in embodiment 7 are used again to describe a structure of this embodiment. In this embodiment, like elements are indicated by like reference numerals used in embodiment 7, and detailed descriptions thereof are omitted. FIG. 9 is a block diagram showing a structure of the control section 17. Embodiment 11 is different from embodiments 7–10 in that the control section 17 includes a time measurement section 34 and a storage section 35.

The control section 17 opens a plurality of the opening/closing sections 14 so as to allow fluid to flow therethrough. In the meantime, the control section 17 corrects the zero-point of a measurement section 15 in a flow path in which an opening/closing section 14 is closed.

The control section 17 has a time measurement section 34. The time measurement section 34 transmits a signal to the zero-point examination section 40 at a prescribed time such that the zero-point of the measurement section 15 in the closed flow path 13 is corrected. In such a structure, the state of a flow rate which is specific to a system in which the flow rate measurement apparatus is installed has been previously measured, and the zero-point is corrected, for example, at any time within a day when the flow rate is low, whereby the accuracy of the measurement section 15 can be adjusted at an optimum time. Furthermore, the preset time may be statistically determined. For example, in the case of gas flow rate measurement equipment for household use, the preset time is any time within a day except for breakfast time, lunchtime, and a period from evening to night including a bath/shower time, i.e., any time during which gas (measured fluid) rarely flows. By previously setting the number of adjustment operations and times at which the adjustment is performed, the adjustment can be achieved with a small examination error which may be caused in the zero-point.

The control section 17 includes the time measurement section 34 and the storage section 35. A time during which a stable flow rate Q, equal to or lower than a predetermined flow rate, is continuously maintained is measured by the time measurement section 34 and stored in the storage section 35. An operation for correcting the zero-point of a measurement section 15 in a closed flow path is performed at the time stored in the storage section 35. The use conditions inherent to a system to which the flow rate measurement apparatus is attached and the state of the system are previously stored, and the state of the zero-point of the measurement section 15 is checked at a time when the flow rate is stable, whereby the measurement section 15 can be adjusted more accurately.

For example, assume a case where the present invention is applied to a gas flow rate meter for household use. The times for meals in the morning and around noon, a period from evening to night when a bath is used, a period when heating apparatuses are used, etc., are different among families according to their ways of life. Thus, the times when the flow rate measured by the measurement section 15 is equal to or lower than a predetermined value are examined, and by repeating this examination, such times are stored and learned. The control section 17 determines a time to correct the zero-point of the measurement section 15 by using the time measurement section 34. Furthermore, when a calendar function is provided, it is indicated that the total time during which gas is used is sometimes considerably different between a weekday and a day of the weekend. Such information can be incorporated in the storage section as a factor of determination.

(Embodiment 12)

Figure 20:
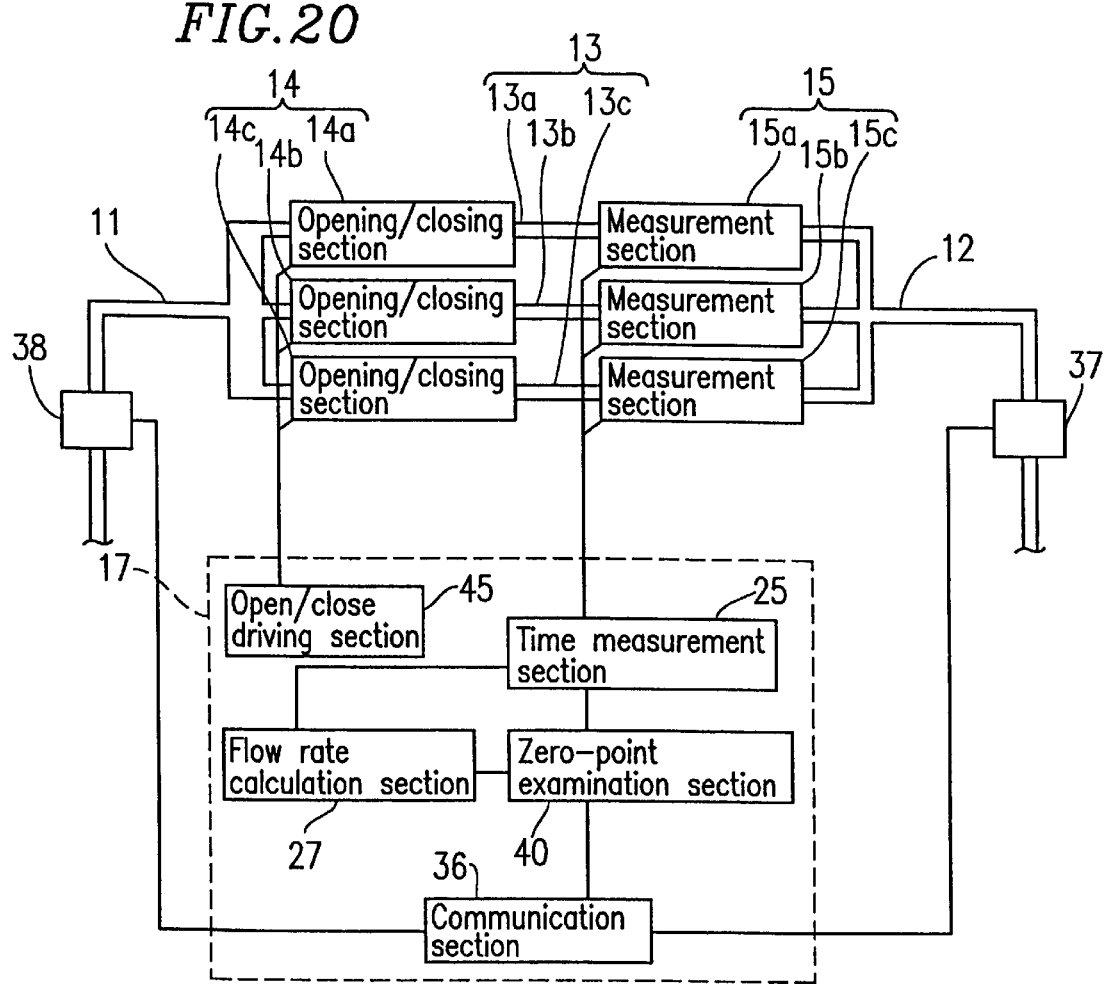
FIG. 20 is a block diagram showing a structure of a control section of a flow rate measurement apparatus according to embodiment 12 of the present invention.
Figure 21:
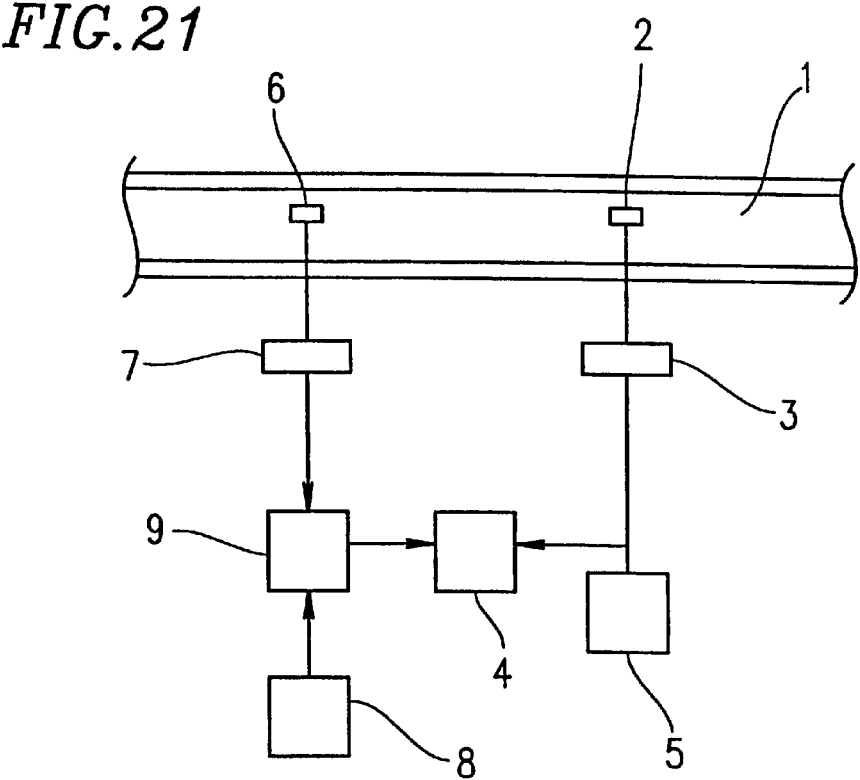
FIG. 21 is a block diagram showing a structure of a conventional flow rate measurement apparatus.

Hereinafter, a flow rate measurement apparatus according to embodiment 12 of the present invention is described. The block diagrams of FIGS. 11A and 11B which have been used in embodiment 7 are used again to describe a structure of this embodiment. In this embodiment, like elements are indicated by like reference numerals used in embodiment 7, and detailed descriptions thereof are omitted. FIG. 20 is a block diagram showing a structure of the control section 17. Embodiment 12 is different from embodiments 7–11 in that the control section 17 includes a communication section 36.

In this embodiment, the control section 17 includes a communication section 36. Usually, the control section 17 opens a plurality of opening/closing sections 14 so as to allow the flow of fluid. In the meantime, the control section 17 corrects the zero-points of measurement sections 15 in paths in which opening/closing sections 14 are closed. The time at which correction of this zero-point is performed may be automatically controlled by using, for example, the fourth timer section 42 (FIG. 17) incorporated in the control section 17 or the like. However, in some cases, a user or an external institution requests a confirmation operation at any time. In preparation for such a case, the communication section 36 of FIG. 20 is provided such that the flow rate measurement apparatus can communicate with an external party. The user directs the start of the confirmation operation by using setting means, such as a switch or a remote controller. In response to this direction signal, the control section 17 corrects the zero-point of the measurement sections 15 in paths in which the opening/closing sections 14 are closed. With such a structure, a user can externally correct the zero-point of a measurement section at any time. Thus, even when a system becomes unstable due to a sudden external disturbance or the like, a user can manually transmits a signal for correcting the zero-point.

Furthermore, as an external signal source for generating a signal that requests the correction of the zero-point, equipment installed in a downstream portion of the flow path can be used. For example, if it is a gas apparatus, a gas water heater 37 or the like can be used. A gas measurement section, or the like, included in the gas apparatus estimates the gas flow rate. When the gas measurement section determines that the flow rate of fluid (gas) is equal to or lower than a predetermined value, the gas measurement section sends a request for zero-point correction through the communication section 36 to the control section 17 of the flow rate measurement apparatus. With such an arrangement, the zero-point correction can be reliably performed by externally supplying a signal when the flow rate of fluid is low. Similarly, as an external signal source, equipment installed in an upstream portion of the inflow path 11, for example, a flow rate measurement section 38 in an output section of a large supply plant, may be used. When the flow rate measurement section determines that flowing fluid has an amount equal to or lower than a predetermined amount, the flow rate measurement section sends a request for zero-point correction through the communication section 36 to the control section 17 of the flow rate measurement apparatus. With this arrangement, the zero-point correction can be reliably performed by externally supplying a signal when the flow rate of fluid is low. The externally-supplied signal may be supplied from an apparatus including a timer section or from a central meter to which apparatuses are connected. With this structure, correction of the zero-point can be externally requested within a certain time.

It is apparent that some of embodiments 7–12 described hereinabove can be combined. When unnecessary zero-point correction is omitted by performing zero-point correction only when the value of the flow rate calculation section indicates an abnormal value, power consumption is reduced. In another embodiment, when the flow rate is equal to or smaller than a predetermined flow rate value, this is considered as a change in the zero-point, and accordingly, zero-point correction is performed so as to deal with a very small leakage of fluid. Such an embodiment can be readily practiced by those skilled in the art.

Furthermore, a plurality of flow paths are used so as to measure the flow rate of fluid over a wide range of a very low flow rate to a large flow rate, and the zero-point of a measurement section in a closed flow path is corrected, whereby the flow rate measurement can be performed always with high accuracy. Furthermore, a periodical operation of an opening/closing section can prevent itself from being stuck to the flow path, and the reliability of the measurement apparatus can be improved.

In the above embodiments, the fluid is described as gas in some descriptions. However, the present invention is not limited to gas. Similar effects can be obtained even when the fluid is liquid such as city water or other gaseous bodies.

INDUSTRIAL APPLICABILITY

As described above, a flow rate measurement apparatus of the present invention produces the following effects:

(1) The flow rate measurement apparatus has a structure including a plurality of flow paths. In such a structure, the gain correction is performed in a flow path in which flow rate measurement is not being performed, without stopping the flow rate measurement in the flow rate measurement apparatus. Then, opening/closing sections are switched such that the flow rate measurement can be performed using the flow path in which the gain correction has been completed. Thus, when this flow path in which the gain correction has been completed is opened, a stable measurement system can be obtained, measurement is free from gain variation, and the measurement accuracy is prevented from being unstable.

(2) The gain of a measurement section in a closed flow path is corrected, and opening/closing of flow paths are switched at a predetermined time interval. From such an arrangement, even when a variation in the gain of the measurement section is caused in a flow path in which flow rate measurement is being performed due to a secular change or the like, stable measurement with no variation in gain can be recovered within a certain time, and the measurement accuracy is prevented from being unstable.

(3) When a flow rate determination section determines that the flow rate of fluid is equal to or lower than a predetermined flow rate, the flow of the fluid is small, and accordingly, an external disturbance from downstream is also small. Thus, examination of the gain in a flow path in which an opening/closing section is closed can be performed without causing an error due to influences from downstream.

(4) When a flow rate determination section determines that the flow rate of fluid is higher than a predetermined flow rate, a gain correction operation for a measurement section in a closed flow path can be adversely influenced by an external disturbance caused due to a large quantity of fluid from downstream, or it can be required to open the opening/closing sections for allowing the fluid to flow through the flow paths in order to measure a high flow rate. In such a case, examination of the gain is stopped such that measurement of the flow rate can be immediately started without decreasing the measurement sensitivity.

(5) By using a timer section, the gain of a measurement section in a flow path in which an opening/closing section is closed can be corrected at a predetermined time interval. Therefore, even when a variation is caused in the gain due to secular changes including external disturbance, such as temperature, humidity, etc., a correction is performed such that the variation is reduced within a predetermined time. Thus, the flow rate measurement apparatus of the present invention has a sufficient capacity to deal with a case where an abrupt increase in the flow rate occurs, and accordingly, it is required to open the closed flow paths.

(6) A flow rate state which is specific to a system in which the flow rate measurement apparatus is installed is previously measured. For example, a time when the flow rate is low is set in a time measurement section, and the gain correction is performed at the time set in the time measurement section, whereby the accuracy of the measurement section can be adjusted at an optimum time.

(7) A time during which a stable flow rate equal to or lower than a predetermined flow rate is continuously maintained is measured by a time measurement section and stored in a storage section, and an operation for correcting the gain of a measurement section in a closed flow path is performed at the time stored in the storage section. The state of the gain of the measurement section is checked at a time when the flow rate is stable which is determined in consideration of the use conditions inherent to a system to which the flow rate measurement apparatus is attached and the state of the system, whereby the measurement section can be adjusted more accurately.

(8) By using a communication section, a user can externally correct the gain of a measurement section at any time. Thus, even when a system becomes unstable due to a sudden external disturbance or the like, a user can manually transmits a signal for correcting the gain.

(9) The flow rate measurement apparatus has a structure including a plurality of flow paths. In such a structure, the zero-point correction is performed in a flow path in which flow rate measurement is not being performed, without stopping the flow rate measurement in the flow rate measurement apparatus. Then, opening/closing sections are switched such that the flow rate measurement can be performed using the flow path in which the zero-point correction has been completed. Thus, when this flow path in which the zero-point correction has been completed is opened, a stable measurement system can be obtained, measurement is free from zero-point shift, and the measurement accuracy is prevented from being unstable.

(10) The zero-point of a measurement section in a closed flow path is corrected, and opening/closing of flow paths are switched at a predetermined time interval. From such an arrangement, even when a variation in the zero-point of the measurement section is caused in a flow path in which flow rate measurement is being performed due to a secular change or the like, stable measurement with no zero-point shift can be recovered within a certain time, and the measurement accuracy is prevented from being unstable.

(11) When a flow rate determination section determines that the flow rate of fluid is equal to or lower than a predetermined flow rate, the flow of the fluid is small, and accordingly, an external disturbance from downstream is also small. Thus, the zero-point examination in a flow path in which an opening/closing section is closed can be performed without causing an error due to influences from downstream.

(12) When a flow rate determination section determines that the flow rate of fluid is higher than a predetermined flow rate, a zero-point correction operation for a measurement section in a closed flow path can be adversely influenced by an external disturbance caused due to a large quantity of fluid from downstream, or it can be required to open the opening/closing sections for allowing the fluid to flow through the flow paths in order to measure a high flow rate. In such a case, zero-point examination is stopped such that measurement of the flow rate can be immediately started without decreasing the zero-point accuracy.

(13) By using a timer section, the zero-point of a measurement section in a flow path in which an opening/closing section is closed can be corrected at a predetermined time interval. Therefore, even when the zero-point is shifted due to secular changes including external disturbance, such as temperature, humidity, etc., a correction is performed such that the shift is reduced within a predetermined time. Thus, the flow rate measurement apparatus of the present invention has a sufficient capacity to deal with a case where an abrupt increase in the flow rate occurs, and accordingly, it is required to open the closed flow paths.

(14) A flow rate state which is specific to a system in which the flow rate measurement apparatus is installed is previously measured. For example, a time during which the flow rate is low is set in a time measurement section, and the zero-point correction is performed at the time set in the time measurement section, whereby the accuracy of the measurement section can be adjusted at an optimum time.

(15) A time when a stable flow rate equal to or lower than a predetermined flow rate is continuously maintained is measured by a time measurement section and stored in a storage section, and an operation for correcting the zero-point of a measurement section in a closed flow path is performed at the time stored in the storage section. The state of the zero-point of the measurement section is checked at a time when the flow rate is stable which is determined in consideration with the use conditions inherent to a system to which the flow rate measurement apparatus is attached and the state of the system. Hence, the measurement section can be adjusted more accurately.

(16) By using a communication section, a user can externally correct the zero-point of a measurement section at any time. Thus, even when a system becomes unstable due to a sudden external disturbance or the like, a user can manually transmits a signal for correcting the zero-point.

(17) An ultrasonic wave signal transmission/reception system provided in a flow path is used as a measurement section. Therefore, the flow rate of fluid can be measured without causing a disturbance in the flow of the fluid. Moreover, due to the available combinations of a plurality of flow paths, the flow rate can be quickly measured with high accuracy over a wide flow rate range.

(18) The measurement section may formed by: a heat radiation section which utilizes a power source provided in a flow path as a drive source; at least one thermosensitive section for detecting a change in temperature caused according to the flow rate; and a flow rate calculation section for calculating the flow rate based on a change in a signal in the thermosensitive section. In this case, stable flow rate measurements can be achieved with a control circuit having a simple structure. Furthermore, the measurement section does not have movable parts, and therefore, the failure rate thereof is low. Moreover, due to the available combinations of a plurality of flow paths, the flow rate can be quickly measured with high accuracy over a wide flow rate range.

What is claimed is:

1. A flow rate measurement apparatus, comprising:
a plurality of flow paths provided between an inflow port and an outflow port;
opening/closing sections for opening/closing each of the plurality of flow paths;
measurement sections for a measuring of flow rate of fluid flowing through each one of the plurality of flow paths; and
a control section for controlling the opening/closing sections and the measurement section;
wherein the control section includes:
a section for switching a flow path so as to be closed by the opening/closing section; and
a gain adjustment section for correcting a gain of the measurement section in a flow path which is closed by the opening/closing section.

2. A flow rate measurement apparatus according to claim 1, wherein the control section includes, as the section for switching a flow path so as to be closed by the opening/closing section, a first timer section for switching a flow path so as to be closed by the opening/closing section at a predetermined time interval.

3. A flow rate measurement apparatus according to claim 1, wherein the control section includes, as the section for switching a flow path so as to be closed by the opening/closing section, a flow rate calculation section for calculating a flow rate based on an output of the measurement section; and a flow rate determination section for transmitting to the gain adjustment section a signal which starts a correction of the gain of the measurement section when the flow rate calculated by the flow rate calculation section is lower than a predetermined flow rate.

4. A flow rate measurement apparatus according to claim 1, wherein the control section includes, as the section for switching a flow path so as to be closed by the opening/closing section, a flow rate calculation section for calculating a flow rate based on an output of the measurement section; and a flow rate determination section for transmitting to the gain adjustment section a signal which stops a correction of the gain of the measurement section when the flow rate calculated by the flow rate calculation section during the correction of the gain of the measurement section is higher than a predetermined flow rate.

5. A flow rate measurement apparatus according to claim 2, wherein the control section includes a second timer section for transmitting to the gain adjustment section a signal, which starts a correction of the gain of the measurement section, at a predetermined time interval.

6. A flow rate measurement apparatus according to claim 1, wherein the control section includes a time measurement section for transmitting to the gain adjustment section a signal, which starts a correction of the gain of the measurement section at a predetermined time interval.

7. A flow rate measurement apparatus according to claim 1, wherein the control section includes a time measurement section for storing in a storage section a time when a flow rate of fluid flowing through a flow path is continuously maintained equal to or lower than a predetermined flow rate and transmitted to the gain adjustment section a signal which starts a correction of the gain of the measurement section at the time stored in the storage section.

8. A flow rate measurement apparatus according to claim 1, wherein the control section includes a communication section for receiving a signal from outside of the flow rate measurement apparatus and a transmitting to the gain adjustment section a signal which starts a correction of the gain of the measurement section.

9. A flow rate measurement apparatus according to claim 1, wherein the measurement section includes:
a first transducer and a second transducer which transmit and receive an ultrasonic wave signal;
a transmission section for transmitting a periodic drive signal to the first transducer and the second transducer; and
a flow rate calculation section for calculating a flow rate based on a propagation time of the ultrasonic wave signal between the first transducer and the second transducer.

10. A flow rate measurement apparatus according to claim 1, wherein the measurement section includes:
a thermosensitive section for detecting a change in temperature which is caused by a change in flow rate; and
a flow rate calculation section for calculating a flow rate based on an output of the thermosensitive section.

11. A flow rate measurement apparatus according to claim 1, wherein the plurality of flow paths includes at least two types of flow paths having different cross-sectional areas.

12. A flow rate measurement apparatus, comprising:
a plurality of flow paths provided between an inflow port and an outflow port;
a plurality of opening/closing sections for opening/closing each of the plurality of flow paths;
measurement sections for measuring a flow rate of fluid flowing through each of the plurality of flow paths; and
a control section for controlling the opening/closing sections and the measurement sections;
wherein the control section includes: a section for switching a flow path so as to be closed by the opening/closing section; and a zero-point examination section for detecting and correcting a zero-point of the measurement section in a flow path which is closed by the opening/closing section.

13. A flow rate measurement apparatus according to claim 12, wherein said section for switching a flow path so as to be closed by the opening/closing section, includes a third timer section for switching a flow path so as to be closed by the opening/closing section at a predetermined time interval.

14. A flow rate measurement apparatus according to claim 12, wherein the control section includes, as the section for switching a flow path so as to be closed by the opening/closing section, a flow rate calculation section for calculating a flow rate based on an output of the measurement section; and a flow rate determination section for transmitting to the zero-point examination section a signal which starts a correction of the zero-point of the measurement section when the flow rate calculated by the flow rate calculation section is lower than a predetermined flow rate.

15. A flow rate measurement apparatus according to claim 12, wherein the control section includes, as the section for switching a flow path so as to be closed by the opening/closing section, a flow rate calculation section for calculating a flow rate based on an output of the measurement section; and a flow rate determination section for transmitting to the zero-point examination section a signal which stops a correction of the zero-point of the measurement section when the flow rate calculated by the flow rate calculation section during the correction of the zero-point of the measurement section is higher than a predetermined flow rate.

16. A flow rate measurement apparatus according to claim 12, wherein the control section includes a fourth timer section for transmitting to the zero-point examination section, a signal, which starts a correction of the zero-point of the measurement section at a predetermined time interval.

17. A flow rate measurement apparatus according to claim 12, wherein the control section includes a time measurement section for transmitting a signal, which starts a correction of the zero-point of the measurement section at a prescribed time, to the zero-point examination section at a predetermined time interval.

18. A flow rate measurement apparatus according to claim 12, wherein the control section includes a time measurement section for storing in a storage section a time when a flow rate of fluid flowing through a flow path is continuously maintained equal to or lower than a predetermined flow rate and transmitting to the zero-point examination section a signal which starts a correction of the zero-point of the measurement section at the time stored in the storage section.

19. A flow rate measurement apparatus according to claim 12, wherein the control section includes a communication section for receiving a signal from outside of the flow rate measurement apparatus and transmitting to the zero-point examination section a signal which starts a correction of the zero-point of the measurement section.

20. A flow rate measurement apparatus according to claim 12, wherein the measurement section includes:
a first transducer and a second transducer which transmit and receive an ultrasonic wave signal;
a transmission section for transmitting a periodic drive signal to the first transducer and the second transducer; and
a flow rate calculation section for calculating a flow rate based on a propagation time of the ultrasonic wave signal between the first transducer and the second transducer.

21. A flow rate measurement apparatus according to claim 12, wherein the measurement section includes:
a thermosensitive section for detecting a change in temperature which is caused by a change in flow rate; and
a flow rate calculation section for calculating a flow rate based on an output of the thermosensitive section.

22. A flow rate measurement apparatus, comprising:
a plurality of flow paths provided between an inflow port and an outflow port;
opening/closing sections for opening/closing at least one of the plurality of flow paths;
measurement sections for measuring a flow rate of fluid flowing through the plurality of flow paths; and
a control section for controlling the opening/closing sections and the measurement sections;
wherein the control section includes at least one of: a zero-point examination section for detecting and correcting a zero-point of the measurement section in a flow path which is closed by the opening/closing section; a gain adjustment section for correcting a gain of the measurement section in a flow path which is closed by the opening/closing section; and a total flow rate measurement section for measuring a total flow rate of fluid flowing from the inflow port to the outflow port, and the measurement section includes:
a first transducer and a second transducer which transmit and receive an ultrasonic wave signal;
a transmission section for transmitting a periodic drive signal to the first transducer and the second transducer;
an amplifying section for amplifying the received ultrasonic wave signal;
a comparison section for comparing a signal output from the amplifying section with a reference signal;
a repetition section for repeating ultrasonic wave transmission a plurality of times between the first transducer and the second transducer according to an output of the comparison section;
a delay section for delaying the ultrasonic wave signal by a predetermined time during the repetition of the ultrasonic wave transmission; and
a flow rate calculation section for calculating a flow rate based on a propagation time of the ultrasonic wave signal between the first transducer and the second transducer.

23. A flow rate measurement apparatus according to claim 12, wherein the plurality of flow paths includes at least two types of flow paths having different cross-sectional areas.

* * * * *

UNITED STATES PATENT AND TRADEMARK OFFICE
CERTIFICATE OF CORRECTION

PATENT NO.   : 6,644,129 B1
DATED        : November 11, 2003
INVENTOR(S)  : Shiba It is certified that error appears in the above-identified patent and that said Letters Patent is hereby corrected as shown below:

<u>Title page,</u>
Item [73], Assignee, should read -- Matsuchita Electric Industrial Co., Ltd. --.

Signed and Sealed this

Ninth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO.     : 6,644,129 B1
DATED          : November 11, 2003
INVENTOR(S)    : Shiba It is certified that error appears in the above-identified patent and that said Letters Patent is hereby corrected as shown below:

<u>Title page,</u>
Item [73], Assignee, should read -- Matsushita Electric Industrial Co., Ltd. --.

This Certificate Supercedes Certificate of Correction issued on March 9, 2004

Signed and Sealed this

Twenty-ninth Day of June, 2004

JON W. DUDAS
*Acting Director of the United States Patent and Trademark Office*